(12) United States Patent
Man

(10) Patent No.: US 9,187,146 B2
(45) Date of Patent: Nov. 17, 2015

(54) CYCLE HEADSETS

(75) Inventor: Savy Man, Wellington (NZ)

(73) Assignee: Savvy Design Holdings Limited, Upper Hutt (NZ)

( * ) Notice: Subject to any disclaimer, the term of this patent is extended or adjusted under 35 U.S.C. 154(b) by 281 days.

(21) Appl. No.: 13/701,214

(22) PCT Filed: Jul. 7, 2011

(86) PCT No.: PCT/NZ2011/000127
§ 371 (c)(1),
(2), (4) Date: Nov. 30, 2012

(87) PCT Pub. No.: WO2012/005610
PCT Pub. Date: Jan. 12, 2012

(65) Prior Publication Data
US 2013/0076000 A1    Mar. 28, 2013

(30) Foreign Application Priority Data

Jul. 9, 2010  (NZ) .......................... 586709
Feb. 3, 2011  (NZ) .......................... 590902

(51) Int. Cl.
*B62K 19/32* (2006.01)
*B62K 21/12* (2006.01)
*B62K 21/18* (2006.01)
*B62J 99/00* (2009.01)

(52) U.S. Cl.
CPC .............. *B62K 19/32* (2013.01); *B62K 21/12* (2013.01); *B62K 21/18* (2013.01); *B62J 2099/0046* (2013.01)

(58) Field of Classification Search
CPC ......... B62K 19/32; B62K 21/18; B62K 19/38
USPC ................. 280/279, 281.1; 74/551.1
See application file for complete search history.

(56) References Cited

U.S. PATENT DOCUMENTS

| 5,803,207 | A  | * | 9/1998 | Nielsen ............... 188/24.12 |
| 6,220,398 | B1 | * | 4/2001 | Wu ..................... 188/24.11 |
| 6,224,079 | B1 |   | 5/2001 | Goring |
| 7,000,936 | B2 | * | 2/2006 | Schmider ............ 280/281.1 |
| 7,204,349 | B2 |   | 4/2007 | Goring |
| 7,240,772 | B2 | * | 7/2007 | Tsai .................... 188/24.22 |
| 7,891,687 | B2 | * | 2/2011 | Schmider ............ 280/281.1 |
| 8,684,386 | B2 | * | 4/2014 | Matthews et al. ....... 280/279 |

(Continued)

FOREIGN PATENT DOCUMENTS

FR           571408         5/2012

*Primary Examiner* — Tony Winner
(74) *Attorney, Agent, or Firm* — Larson & Anderson, LLC

(57) ABSTRACT

Discloses methods and apparatus for headset transmissions mounted to a steerer tube rotationally mounted relative to a head-tube and headset of a cycle frame. A first transmission member mounts about a rotational axis of the steerer tube. The first transmission member rotates with the steerer tube about the rotational axis, and can also translate relative to the steerer tube to transmit a first displacement force to or from a handle bar mounted device. The first displacement force is transmitted to the first transmission member from an interior of the steerer tube. A second transmission member mounts about the rotational axis of the steerer tube. The second transmission member is rotationally isolated to rotate relative to the first transmission member, and can translate with the first transmission member. The second transmission member allows transmission of a second displacement force, from the first displacement force, to a cycle frame mounted device.

23 Claims, 18 Drawing Sheets

(56) References Cited

U.S. PATENT DOCUMENTS

| | | | |
|---|---|---|---|
| 2005/0115777 A1* | 6/2005 | Goring | 188/24.11 |
| 2011/0121538 A1* | 5/2011 | Giroux | 280/280 |
| 2013/0241170 A1* | 9/2013 | Talavasek et al. | 280/279 |

* cited by examiner

CYCLE HEADSETS

RELATED CASES AND PRIORITY

The present application is national stage application of PCT/NZ2011/000127 filed on Jul. 7, 2011, which claims priority to New Zealand application nos. 586709, filed on Jul. 9, 2010, and 590902 filed on Feb. 3, 2011, all of which are incorporated herein by reference for all purposes.

TECHNICAL FIELD OF THE INVENTION

The present invention relates to cycle headsets. In particular, though not solely, the present invention is directed to a cycle headset transmission to allow cable actuated devices that do not interfere with rotation of the handle bar and forks of the cycle.

BACKGROUND OF THE INVENTION

Cycles of a two wheeled or more nature normally have a steerer mechanism, typically of a fork that retains a wheel, normally the front wheel. The fork has a steerer tube that rotates within a head-tube of the cycle, via a headset. The headset is normally two circular arrays of ball bearings at the top and bottom of the head-tube which the steerer tube of the fork runs in so it can rotate to steer the front wheel.

Connected to the top of the steerer tube is a handle bar, normally held to the steerer tube via a stem. The handle bar is gripped by a user and is used to steer the cycle and also has controls, for example brakes or gear controls, mounted on it.

Such controls may be transmitted to corresponding devices on the fork or frame of the cycle.

Typically with the normal range or rotation of the handle bar and stem there is no issue with tangling of controls from the handle bar to the fork or frame of the cycle.

When however there is a desire to spin the handle bars through more than 180 degrees then such controls can become tangled, for example when they control via cables, for example cables within sheaths typical for cycle controls.

The solution for the fork control, for example the fork mounted brake, is relatively straightforward as the control simply passes through the interior of the fork or head-tube and rotates with the handle bar and fork as they are locked together.

However, a problem arises when trying to pass the control from the handle bar to the frame yet still allow 180° or more motion of the handle bar without tangling. Movement of the handle bar through more than 180° may occur when performing tricks such as bar spins, or accidentally.

Products are known to solve this problem and are known variously as a GYRO™, detangler or rotor.

One such solution is the Odyssey GYRO™ product. This is a rotating cuff that sits external to the head-tube to allow rotation of the handle bars yet allow transmission of control inputs, for example brakes, to the frame of the cycle. One shortcoming of this product is that it can only transmit one type of control, for example brakes. It cannot transmit multiple controls, for example brake and gear control. Because it is external it may become contaminated when riding and also may interfere with the rider or user, snagging them, or even injuring them.

Another product is that shown in U.S. Pat. No. 6,224,079 and U.S. Pat. No. 7,204,349. Both these documents disclose a detangler located within the headset of the cycle. However, both these designs may load the internals of the detangler eccentrically, twist and stretch the cables, have high friction, and can be difficult to assemble. They also require custom headset and head-tube components, which reduces a user's freedom to choose which headset and frame they wish to use and may increase cost.

Internal detanglers are also desirable to prevent contamination of the rotating and sliding assemblies, prevent interference with, and snagging and injury of the rider or user. They also provide a more aesthetic and uncluttered assembly of the head-tube area and the cycle in general.

Internal detanglers to date also may require oversized head-tubes, steerer tubes and headsets to accommodate the detangler internally. This detracts from the choice a rider may have, and from the economies of scale and therefore cost available by using existing standard sizes in the industry.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved cycle headset and transmission therefor, or to overcome the above shortcomings or address the above desiderata, or to at least provide the public with a useful choice.

BRIEF DESCRIPTION OF THE INVENTION

In a first aspect the present invention may be said to consist in a headset transmission adapted to mount to or about a steerer tube rotationally mounted relative to a head-tube of a cycle frame via a headset, comprising or including:

a first transmission member mountable at least in part about a rotational axis of said steerer tube, which first transmission member:

can rotate with said steerer tube about said rotational axis;

can translate relative to said steerer tube to transmit a first displacement force to or from a handle bar mounted lever or device; and wherein said first displacement force is transmitted to or from said first transmission member to said handle bar mounted lever or device from an interior of said steerer tube;

a second transmission member mountable at least in part about said rotational axis of said steerer tube, which second transmission member:

is mounted substantially only on, or from, said steerer tube;

is rotationally isolated, so as to rotate relative to said first transmission member;

can directly or indirectly translate with said first transmission member; and wherein said second transmission member allows transmission of a second displacement force, at least proportional to said first displacement force, to or from a cycle frame mounted lever or device.

Preferably translation of said first transmission member and said second transmission member is substantially along, or parallel to, said rotational axis.

Preferably said rotational isolation is via a sliding engagement of said second transmission member with an interior or part thereof of said head-tube.

Preferably said first transmission member sits substantially externally of said steerer tube.

Alternatively said first transmission member sits substantially internally of said steerer tube.

Preferably said first displacement force is transmitted to or from said first transmission member by a first flexible tensile member engaged or engageable between said first transmission member and said handle bar mounted lever or device.

Preferably said first flexible tensile member is directly engaged to said first transmission member, or part thereof.

Preferably said first flexible tensile member is engaged or engageable to said first transmission member via a connecting member that runs at least in part in said interior of said steerer tube.

Preferably said connecting member extends laterally to said rotational axis to load said first transmission member substantially equally either side of said rotational axis.

Preferably said connecting member is a pin.

Preferably said steerer tube has at least one steerer tube aperture to rotationally engage with said first transmission member and cause said first transmission member to rotate with said steerer tube.

Preferably said at least one steerer tube aperture is elongate with a major axis aligned substantially parallel to said rotational axis.

Preferably said connecting member extends at least in part through said steerer tube via said at least one steerer tube aperture to allow said translation and engage said first transmission member, said connecting member to drive or be driven by said first transmission member.

Preferably said connecting member as a pin lies on any one or more of
  a. a plane that lies substantially orthogonal to said rotational axis, at any angle on said plane; or
  b. a vertical plane that passes through said rotational axis and said vertical plane is substantially parallel to a straight-ahead steering position of a fork attached to said steerer tube.

Preferably said connecting member has at least one flat side surface to run against a mating inside guide surface of said steerer tube aperture.

Preferably there are two said steerer tube apertures diagonally opposed to each other.

Preferably said second transmission member sits substantially externally of said steerer tube.

Preferably said second displacement force is transmitted to or from said second transmission member by a second flexible tensile member engaged or engageable between said second transmission member and said frame mounted lever or device.

Preferably said second flexible tensile member is directly engaged to said second transmission member, or part thereof.

Preferably said second flexible tensile member lies externally to said head-tube.

Preferably said handle bar mounted lever or device is selected from any one or more of the following, but not limited to:
  a brake lever;
  a gear lever or equivalent;
  a suspension adjustment lever; and
  a seat post adjustment lever.

Preferably said cycle frame mounted lever or device is selected from any one or more of the following, but not limited to:
  a brake;
  a gear changer, derailleur or equivalent;
  a suspension component; and
  a seat post.

Preferably between said first transmission member and said second transmission member there is a friction reducing rotational interface.

Preferably said first transmission member, said second transmission member and said steerer tube there is a friction reducing interface.

Preferably a portion of said second transmission member extends externally from said head-tube via at least one head-tube aperture.

Preferably said at least one head-tube aperture also provides said rotational isolation via said sliding engagement with said portion.

Preferably said at least one head-tube aperture is internal or external to said cycle frame.

Preferably said at least one head-tube aperture is on a side of said head-tube.

Preferably said second flexible tensile member lies internally of said cycle frame, at least initially where it is engaged to and departs from said second transmission member.

Preferably said second flexible tensile member is guided internally at least in part by a rigid mount.

Preferably said rigid mount may be any one or more of, but not limited to:
  i. a rigid at least in part casing external to said second flexible tensile member; or
  ii. a pulley or similar.

Preferably said first and second transmission members are identical to each other.

Preferably in use said first transmission member lies below said second transmission member.

Preferably said portion engages said second flexible tensile member to drive or be driven by, said frame mounted lever or device.

Preferably there is a biasing means to aid movement of said first or second flexible tensile member.

Preferably said biasing means is a coil spring.

Preferably said coil spring is in compression between an end of an external casing for said first or second flexible tensile member and an end of said first or second flexible tensile member.

In another aspect the present invention consists in a method of providing a headset transmission for a cycle, said cycle having a steerer tube mounted in a head-tube of a frame of said cycle via a headset, comprising or including the steps of:
  providing a first transmission member and a second transmission member mounted at least in part about a rotational axis of a steerer tube such that said first transmission member can rotate about said rotational axis and translate along said steerer tube, and said second transmission member can translate with or is driven by said first transmission member but is isolated so as to not rotate with said first transmission member;
  providing a first driving or displacement force to or from said first transmission member via an internal region of said steerer tube;
  providing a portion of said second transmission member to receive or transmit a second driving or displacement force; and
  wherein said headset transmission can transmit a force to or from a handle bar device mounted on a handle bar of said steerer tube or part thereof, from or to a frame mounted device or vice versa, whilst allowing rotation of said steerer tube to more than 180 degrees.

Preferably said portion of said second transmission member lies at least in part external to said head-tube.

In yet another aspect the present invention consists in a cycle having a steerer tube mounted in a head-tube of a frame of said cycle via a headset, with at least one headset transmission mounted in or on said head-tube, comprising or including:
- a first transmission member mounted at least in part about a rotational axis of said steerer tube, which first transmission member:
  - rotates with said steerer tube about said rotational axis;
  - translates relative to said steerer tube to transmit a first displacement force to or from a handle bar mounted lever or device; and
  - wherein said first displacement force is transmitted to said first transmission member from an interior of said steerer tube; and
- a second transmission member mounted at least in part about said rotational axis of said steerer tube, which second transmission member:
  - is rotationally isolated, so as to rotate relative to said first transmission member;
  - can directly or indirectly translate with said first transmission member; and
  - wherein said second transmission member allows transmission of a second displacement force, at least proportional to said first displacement force, to or from a cycle frame mounted lever or device.

Preferably there is a plurality of said at least one headset transmission to transmit a plurality of forces from said handle bar or portion thereof mounted device to said cycle frame.

Preferably said handle bar mounted lever or device is selected from any one or more of the following, but not limited to:
- a brake lever;
- a gear lever or equivalent;
- a suspension adjustment lever; and
- a seat post adjustment lever.

Preferably said cycle frame mounted lever or device is selected from any one or more of the following, but not limited to:
- a brake;
- a gear changer, derailleur or equivalent;
- a suspension component; and
- a seat post.

In yet a further aspect the present invention consists in a kit of parts adapted to provide at least one headset transmission for a frame of a cycle, said frame having a head-tube to receive a steerer tube to rotate thereon via a headset, comprising or including:
- a first transmission member mountable at least in part about a rotational axis of said steerer tube, which first transmission member:
  - can rotate with said steerer tube about said rotational axis;
  - can translate relative to said steerer tube to transmit a first displacement force to or from a handle bar mounted lever or device; and
  - wherein said first displacement force is transmitted to said first transmission member from an interior of said steerer tube;
- a second transmission member mountable at least in part about said rotational axis of said steerer tube, which second transmission member:
  - is rotationally isolated, so as to rotate relative to said first transmission member;
  - can directly or indirectly translate with said first transmission member; and
  - wherein said second transmission member allows transmission of a second displacement force, at least proportional to said first displacement force, to or from a cycle frame mounted lever or device.

Preferably said kit includes a headset.

Preferably said kit includes a fork for mounting in said head-tube via said headset.

In yet a further aspect still the present invention consists in a frame for a cycle with at least one aperture in a head-tube of said frame adapted to allow an internal portion of a headset transmission to extend therethrough and which internal portion can bear on said aperture, or part thereof, in a sliding engagement.

Preferably said frame receives and guides at least in part internally a force transmission member from said internal headset transmission.

Preferably said force transmission member is a flexible tensile member.

In yet another aspect the present invention consists in a fork for a cycle with at least one aperture in a steerer tube of said fork, adapted to allow an internal portion of a headset transmission internal to said steerer tube to extend therethrough and which internal portion can translate along said aperture.

In yet another aspect the present invention consists in a headset transmission as herein described with reference to any one or more of the accompanying figures.

In yet another aspect the present invention consists in a method of providing a headset transmission as herein described with reference to any one or more of the accompanying figures.

In yet another aspect the present invention consists in a cycle as herein described with reference to any one or more of the accompanying figures.

In yet another aspect the present invention consists in a kit of parts as herein described with reference to any one or more of the accompanying figures.

In yet another aspect the present invention consists in a frame for a cycle as herein described with reference to any one or more of the accompanying figures.

In yet another aspect the present invention consists in a fork for a cycle as herein described with reference to any one or more of the accompanying figures.

As used herein the term "and/or" means "and" or "or", or both.

As used herein "(s)" following a noun means the plural and/or singular forms of the noun. The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying figures.

BRIEF DESCRIPTION OF THE DRAWINGS

Preferred forms of the present invention will now be described with reference to the accompanying drawings in which.

DETAILED DESCRIPTION OF THE INVENTION

Preferred embodiments will now be described with reference to FIGS. 1 through 10.

Figure 2:
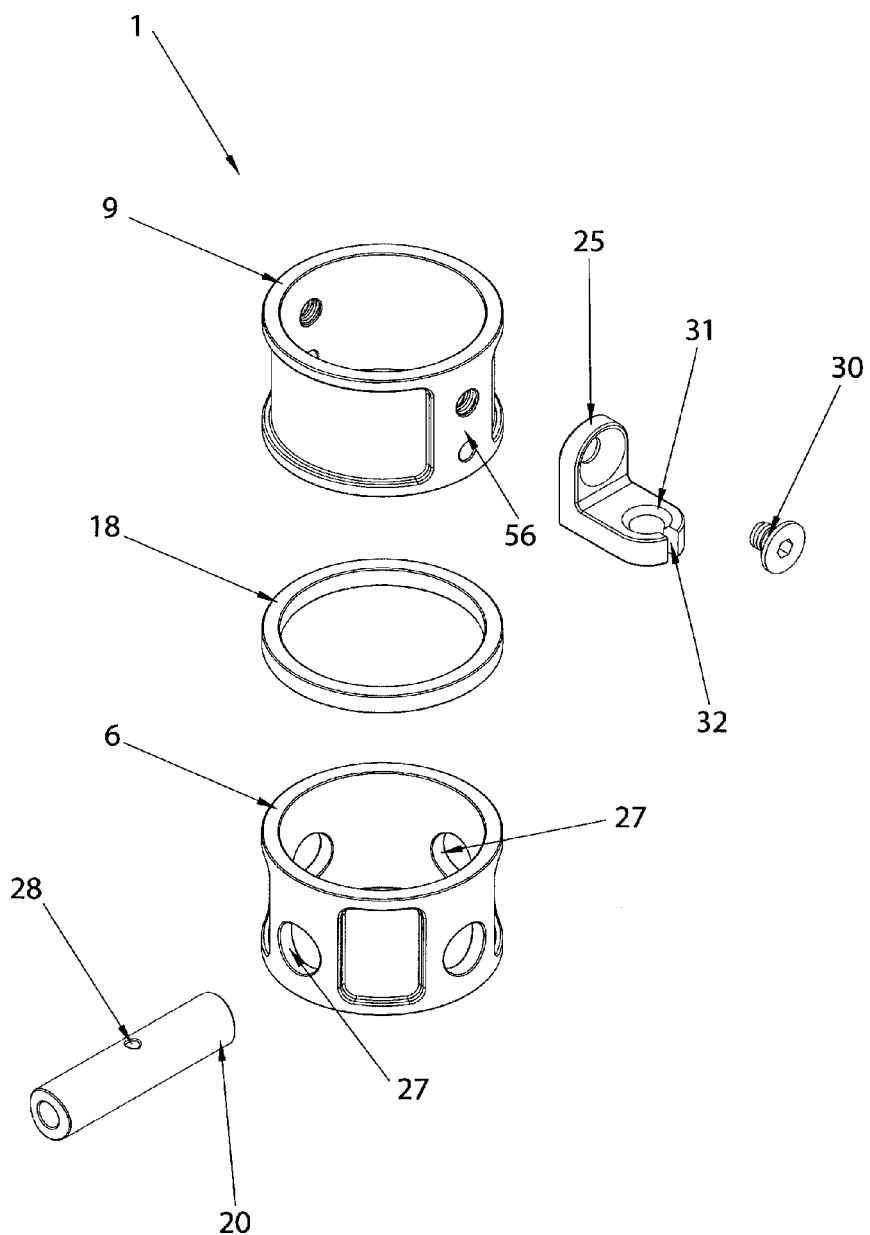
FIG. 2: is an exploded view of the internal components of the headset transmission in one embodiment of the present invention.

Components of a first embodiment of the headset transmission 1 (also known as a rotor) are shown in FIG. 2. The headset transmission 1 consists of a first transmission member 6 (also referred to as a lower rotor) and a second transmission member 9 (also referred to as an upper rotor). Between these two members is a friction reducing rotational interface 18 (also referred to as a plain bearing) whose function will become clear as the invention is described.

In this first embodiment, a connecting member 20 or pin 20 is also present. In the preferred embodiment the connecting member 20 is a pin as shown in FIG. 2. The connecting member 20 engages in at least one receiving aperture 27 (two are shown in FIG. 2) diagonally through the first transmission member 6. The connecting member 20 has a hole 28 vertically through it to receive part of a first flexible tensile member 12 which in the preferred embodiment is an upper cable. Other ways for attaching a flexible cable-like member will also be apparent to those skilled in the art. The internal surface diameters of both the first transmission member 6 and/or the second transmission member 9 have friction reducing interfaces 19, coatings or components thereon. The reason for these will be described below.

In this first embodiment there is an external tab portion 25 (also referred to as an upper rotor tab) that attaches to the body of the second transmission member 9. In the preferred embodiment this is via a threaded fastening 30 as shown. In other embodiments the external tab portion 25 may be integrally formed with the second transmission member 9 or may be attached by other means known in the art. In other embodiments it may be pushed and/or rotated into location with the second transmission member 9 and held in place by other means, for example, the steerer tube 4, head-tube 2 or other parts of the assembly. The external tab portion 25 in this embodiment has a tab aperture 31 which opens via a tab slot 32. The reason for this will be explained below.

Various cut-outs and reliefs may be present on the first transmission member 6 and/or second transmission member 9 to reduce its weight and/or reduce contact surfaces to reduce friction. In the preferred embodiment the headset transmission 1 may be made from a combination of materials such as lightweight alloy for the first and second transmission members 6 and 9 respectively, or a low friction material such as a nylon or glass reinforced plastic. The friction reducing rotational interface 18 and friction reducing interface 19 may be made from a friction reducing material, or coated with such a material, such as PTFE, nylon or a sintered material, such as bronze or a ceramic. In other embodiments the friction reducing rotational interface 18 may actually be a radial array of ball bearings or other such assemblies known in the art to reduce friction between two rotating components. In other embodiments the friction reducing rotational interface 18 and friction reducing interface 19 may be provided purely by a grease or lubricant between the mating surfaces of the first transmission member 6, second transmission member 9 and steerer tube 4. Other methods of creating a friction reducing rotational interface 18 and friction reducing interface 19 are known in the arts.

Figure 3:
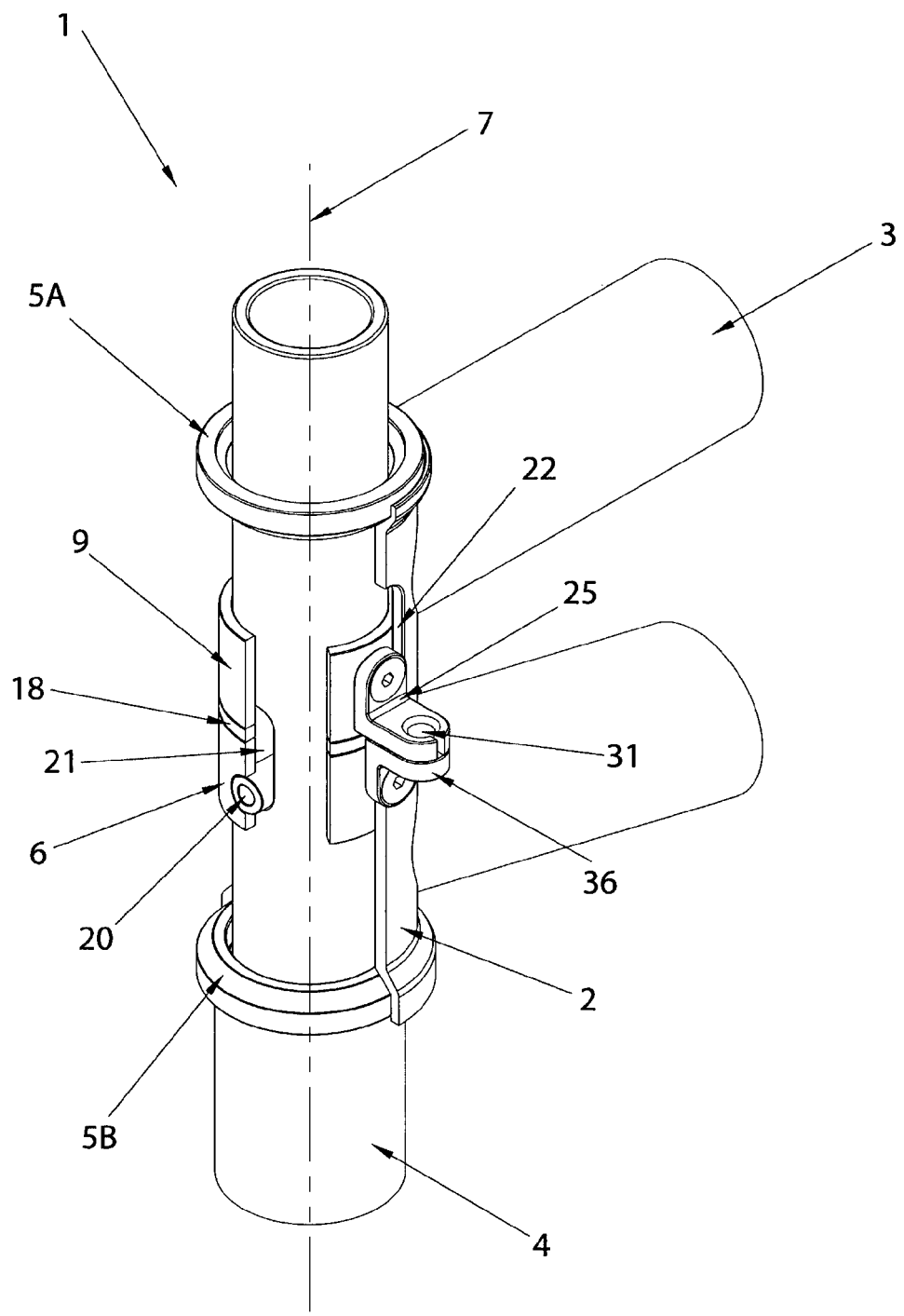
FIG. 3: is a cut-away view along line AA of FIG. 1 showing the internal assembly of the preferred embodiment of the present invention.

In FIG. 3 the headset transmission 1 of FIG. 2 is shown assembled to the head-tube 2 of a cycle frame 3, with a steerer tube 4 of a fork 33 or similar to receive a wheel 34 (FIG. 10) on a cycle frame 3. A headset (lower 5A and upper 5B) is shown to hold the steerer tube 4, and thus the fork 33 in place on the head-tube 2, and to allow it to rotate about the rotational axis 7. The assembly of a fork 33 via a steerer tube 4 into a headset 5 mounted to a head-tube 2 of a frame 3 of a cycle 35 is a known assembly. Typically the wheel is a front wheel 34 such as that shown in FIG. 10. In the example shown in FIG. 10 this allows a user to steer the cycle 35. In the embodiment shown in FIG. 10 this is a bicycle of known construction with the exception of the internal headset transmission 1. However, in other embodiments, the cycle 35 may be a tricycle, or may even be a four-wheeled cycle, a motor-bike or similar motorised wheeled transport.

Returning to FIG. 3, there can be seen the first transmission member 6, the second transmission member 9 and the connecting member 20. In the particular embodiment shown both the first transmission member 6 and the second transmission member 9 reside in the interior volume of the head-tube 2 between the inner diameter of the head-tube 2 and the external diameter of the steerer tube 4. The steerer tube 4 has a steerer tube aperture 21 defined in the preferred embodiment as a slot parallel to the rotational axis 7. When the fork 33 or steerer tube 4 is in the straight-ahead direction, that is, the cycle 35 is moving straight forward, then in the preferred embodiment the steerer tube aperture 21 lies on a vertical plane that runs from front to back of the cycle frame 3 and that passes through the rotational axis 7. The connecting member 20 resides in the steerer tube aperture 21 and, as shown, is able to translate in the direction 26. In the preferred embodiment this translation 26 is parallel to the rotational axis 7. It will be seen the steerer tube 4, when it is rotated about the rotational axis 7, will rotate the connecting member 20, via the steerer tube aperture 21 and therefore the first transmission member 6 with the steerer tube 4.

The external tab portion 25 is shown extending from the second transmission member 9 via a head-tube aperture 22. In the preferred embodiment the head-tube aperture 22 is also a slot, and preferably, runs parallel to the rotational axis 7. Shown mounted to the head-tube 2 is a head-tube tab 36. This is aligned with the external tab portion 25 and has a head-tube tab aperture 37 (that is preferably concentric to the tab aperture 31). Shown also is the friction reducing rotational interface 18 between the otherwise mating surfaces of the first and second transmission members 6 and 9 respectively.

The external tab portion 25 as shown is able to translate 26 in the head-tube aperture 22. However, the external tab portion 25 cannot rotate relative to the head-tube aperture 22 (and therefore the head-tube 2 and cycle frame 3) because of this capture in the head-tube aperture 22. Because the external tab portion 25 is fixed to, or is part of the second transmission member 9, the second transmission member 9 is also rotationally fixed relative to the head-tube 2. The result is that when the steerer tube 4 is rotated the connecting member 20 and first transmission member 6 will rotate with the steerer tube 4. However, the second transmission member 9 and external tab portion 25 will not rotate with the steerer tube 4 and will remain fixed relative to the head-tube 2 and cycle frame 3.

The steerer tube aperture 21 and head-tube aperture 22 allow the assembly of the connecting member 20, first transmission member 6 and second transmission member 9 to translate in the direction 26.

Therefore it can be understood that the steerer tube 4, for example under input from a handle bar 15, can rotate through more or less 180° whilst still allowing a displacement force in the direction of translation 26 to be applied to the cycle frame 3 of the cycle 35 or parts thereof.

The way in which this is applied and transmitted is described below with reference to FIGS. 3, 4, 5 and 7.

Figure 4A:
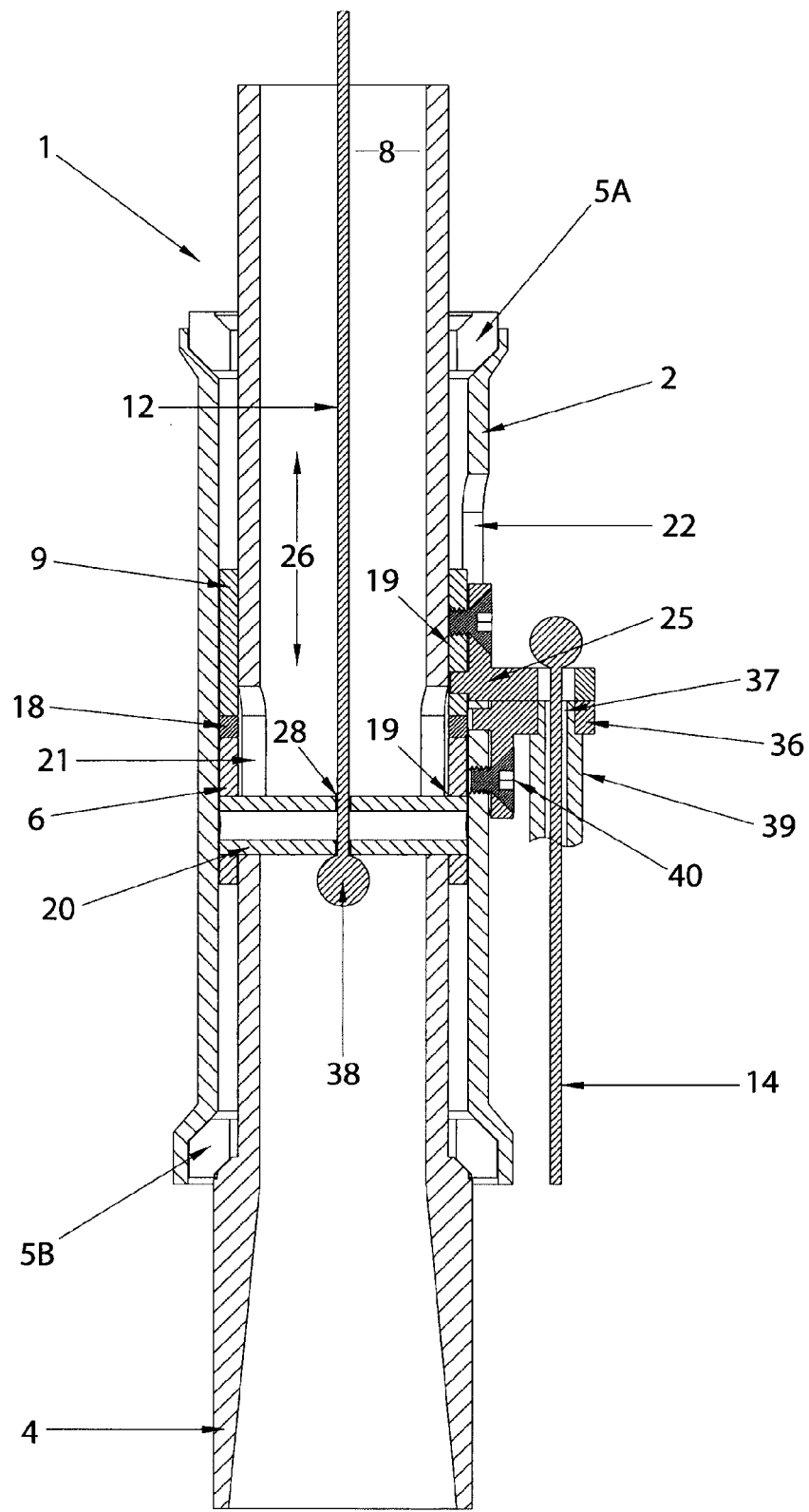
FIG. 4: (A) is a vertical cross-section along a cutting plane on line AA (on the rotational axis) of FIG. 1 of a first embodiment of the present invention; and (B) is a vertical cross-section along a cutting plane on line AA (on the rotational axis) of FIG. 1 of an improvement to the first embodiment of the present invention.
Figure 4B:
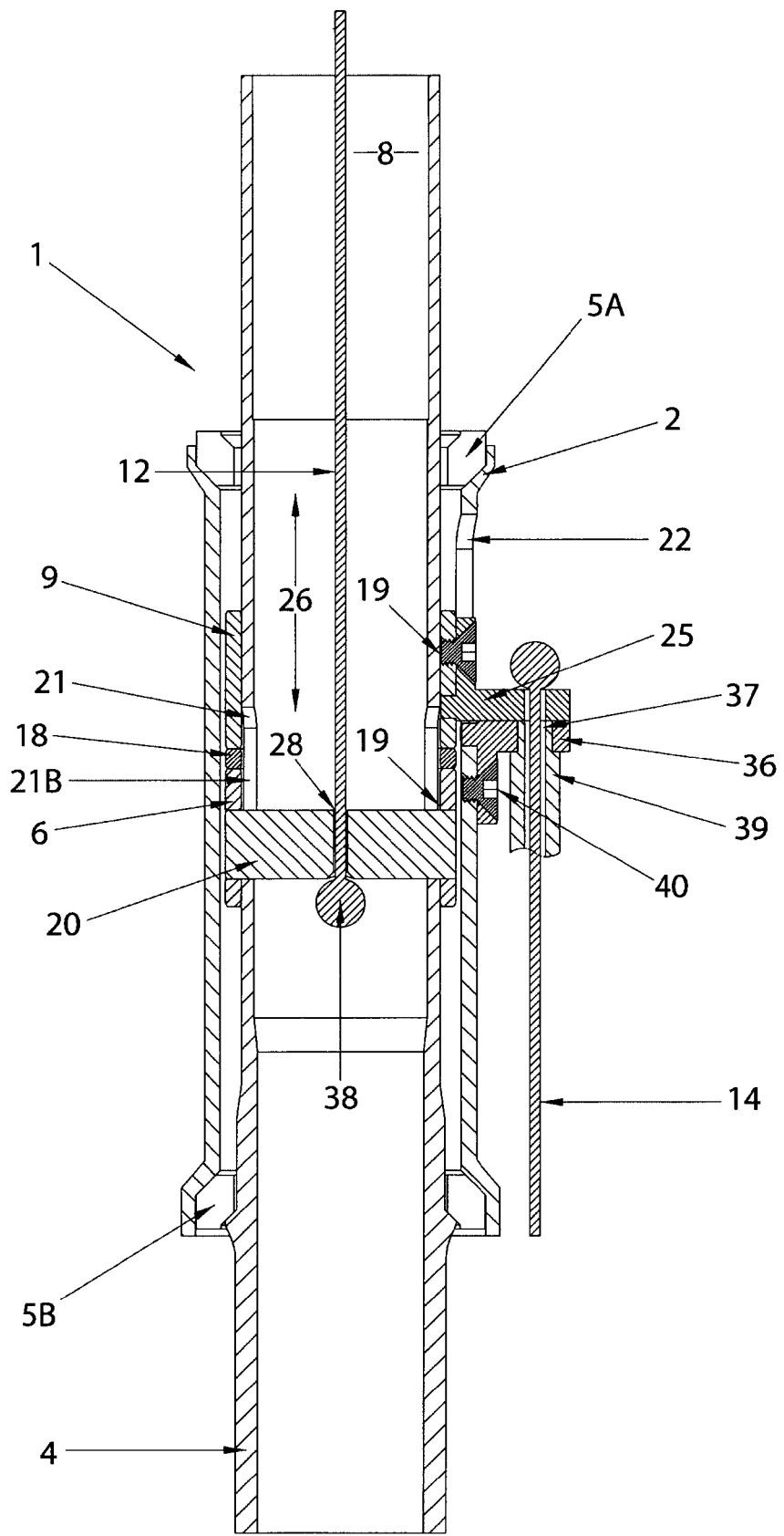
Figure 5:
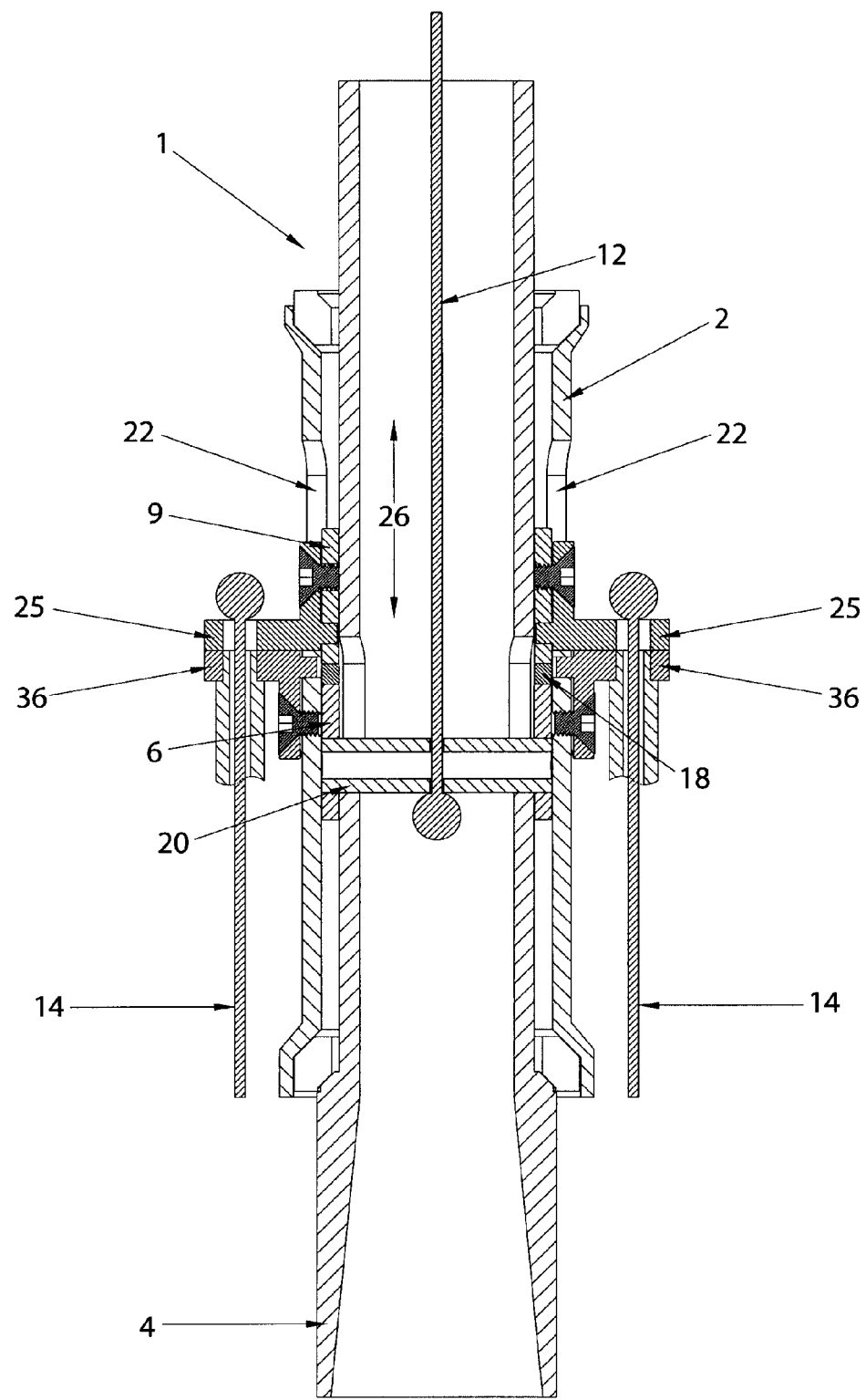
FIG. 5: is a further view of the embodiment of FIG. 4(A) with a variation utilising two cables to actuate a frame mounted lever or device.

The cross-section of the embodiment described in FIG. 3 is shown in FIGS. 4A, 5, and a variation thereof in FIG. 4B. A mechanical GYRO™ or headset transmission 1 is internally located within a cycle's head-tube 2. This device or headset transmission 1 allows the rider or user to spin the steerer tube 4 without tangling up the brake cables 23 and/or gear cables 24 which would otherwise normally run from the handle bar 15 to the frame mounted lever or device 17, for example brake or gear changer. Brake cables 23 and/or gear cables 24 enter through the top of the steerer tube 4 and are attached to the lower GYRO™ connecting pin 20. The connecting pin 20 is held by the lower GYRO™ 6 and is allowed to freely spin from the upper GYRO™ 9 through the adoption of a bush bearing 18. The upper GYRO™ 9 is connected to one or more external GYRO™ tab portions 25, which exit through the head-tube 2 via at least one head-tube aperture 22. The configuration of the mechanical GYRO™ 1 is unique and can accommodate single cable and multi cable configurations. Single cable configuration is displayed in FIG. 4, and multi-cable configuration is displayed in FIG. 5. For the benefit of the diagrams displayed in FIGS. 4, 5, and a variation thereof in FIG. 7, the steerer tubes 4 are rotated 90° from origin about the rotational axis 7.

A first flexible tensile member 12 (also referred to as an upper cable) is shown. The first flexible tensile member 12 is typical of cables used in the cycling or cycle industry and also known as Bowden™ cable. The cable typically runs in a skin or external casing 39 which may be flexible or may be in part rigid such as what is referred to as a noodle in the cycle industry. There may also be adjusters present as for example hollow threaded members, known as barrel adjusters, for adjusting the tension or position of the cable.

There may also be present a biasing means (not shown), such as a spring, to aid the return of the first flexible tensile member 12. This for example can act between the end of the first flexible tensile member 12, for example onto the connecting member 20, and the external casing 39, or which ever component the external casing 39 bears upon, for example the stem 44 or similar. In this embodiment the biasing means is a coil spring in compression which urges the first flexible tensile member 12 out of the external casing 39. Other embodiments may also be used, such as being in tension and pulling downwards on the connecting member 20. One purpose of such biasing means is to overcome any inherent friction in the headset transmission 1 and the first flexible tensile member 12, second flexible tensile member 14 and the external casing 39 or flexible external casing 43 they run in.

Such return biasing means may be present any where on the transmission between the handle bar mounted lever or device 16, such as a brake lever and the frame mounted lever or device 17, for example a rear brake 41.

Typically on the end of such first flexible tensile members 12 and second flexible tensile members 14 there is a ferrule 38 attached or attachable to an end thereof. In the preferred embodiment the first and second flexible tensile members 12 and 14 respectively are cables. Such ferrules 38 may be unitary or moulded onto the first or second flexible tensile member 12 or 14 respectively, however, in other instances, they may be a separate attachment that is attached for example to the first flexible tensile member 12 as part of the assembly process. For example, a ferrule 38 with a grub screw 47 into which the first or second flexible tensile member 12 or 14 respectively is passed and onto which the grub screw 47 can be tightened to retain the ferrule 38 and first or second flexible tensile member 12 or 14 as an assembly. This is shown for example in FIG. 8, the ferrule 38 as attachable via a grub screw 47 to a first or second flexible tensile member (12 or 14 respectively not shown). The first or second flexible tensile member 12 or 14 respectively is passed through the smaller of the two apertures present on the ferrule 38 and the grub screw 47 then engages a thread in the larger of the two apertures of the ferrule 38 to crimp against the first or second flexible tensile member 12 or 14 respectively and thus provide a ferrule 38 held fast to the first or second flexible tensile member 12 or 14 respectively, though other such retaining ferrules are known in the art.

The first and second flexible tensile members 12 and 14 may be typically made from a metallic material such as a twisted wire cable, but also could be made from non-metallic materials, and such cables are known in the art.

The first flexible tensile member 12, as will be described below, is activated by a handle bar mounted lever or device 16, or part thereof, shown in FIG. 1. The first flexible tensile member 12 passes through the hole 28 of the connecting member 20 and, as shown in this embodiment, it is retained there by a ferrule 38. However, in other embodiments there may simply be a pinch screw on the connecting member 20 or first transmission member 6 that impinges on the first flexible tensile member 12 or part thereof to lock it in position. The connecting member 20 is shown translationally captive in the steerer tube aperture 21 and is therefore able to translate 26 under action of the first flexible tensile member 12 or to drive the first flexible tensile member 12. The translational movement of the connecting member 20 can then drive, or be driven, by the first transmission member 6 in a similar translation 26. The first transmission member 6 in turn drives, or is driven, by the second transmission member 9. The external tab portion 25 is then driven by the second transmission member 9 or drives the second transmission member 9.

Connected to the external tab portion 25 running through the tab aperture 31 is a second flexible tensile member 14. This moves the same amount or an amount proportionate to the translation 26 of the second transmission member 9, first transmission member 6, connecting member 20 and first flexible tensile member 12. The head-tube tab 36 provides a location for the external casing 39 (whether flexible, rigid, or a hollow threaded member shown in FIG. 4). Again, the head-tube aperture 22 is shown in which the external tab portion 25 can translate 26.

The head-tube tab 36 may be integrally formed with the head-tube 2, or as in the embodiment as shown in FIGS. 3 through 8, may be attached via a fastening 40 to the head-tube 2.

The location of the friction reducing interface 19 is shown on both the first transmission member 6 and the second transmission member 9 in FIG. 4 as an example.

Clearly shown is the actuation of the first transmission member 6 from the steerer tube interior 8 by the first flexible tensile member 12. The result is in the embodiment shown, a balanced activation of the first transmission member 6, when the first flexible tensile member 12 is more or less diametrically centred on the first transmission member 6. Variations just off diametric centre will also produce near balanced loading of the first transmission member 6. Balanced loading of the first transmission member 6 results in very little sliding friction between the interior surface of the first transmission member 6 and the exterior surface of the steerer tube 4 as the first transmission member 6 translates 26.

The first transmission member 6 is rotationally isolated from the second transmission member 9. This is by the first transmission member 6 being rotationally locked but in sliding engagement 10 with the steerer tube 4 (via, for example, the connecting member 20). Similarly, the second transmission member 9 is rotationally locked but in sliding engagement 10 with the head-tube 2 (via, for example, the external tab portion 25 in the head-tube aperture 22).

Other equivalent mechanisms known in the art may be used to rotationally lock the first transmission member 6 and second transmission member 9 to the steerer tub 4 and head-tube 2 respectively yet still translate 26.

Figure 1:
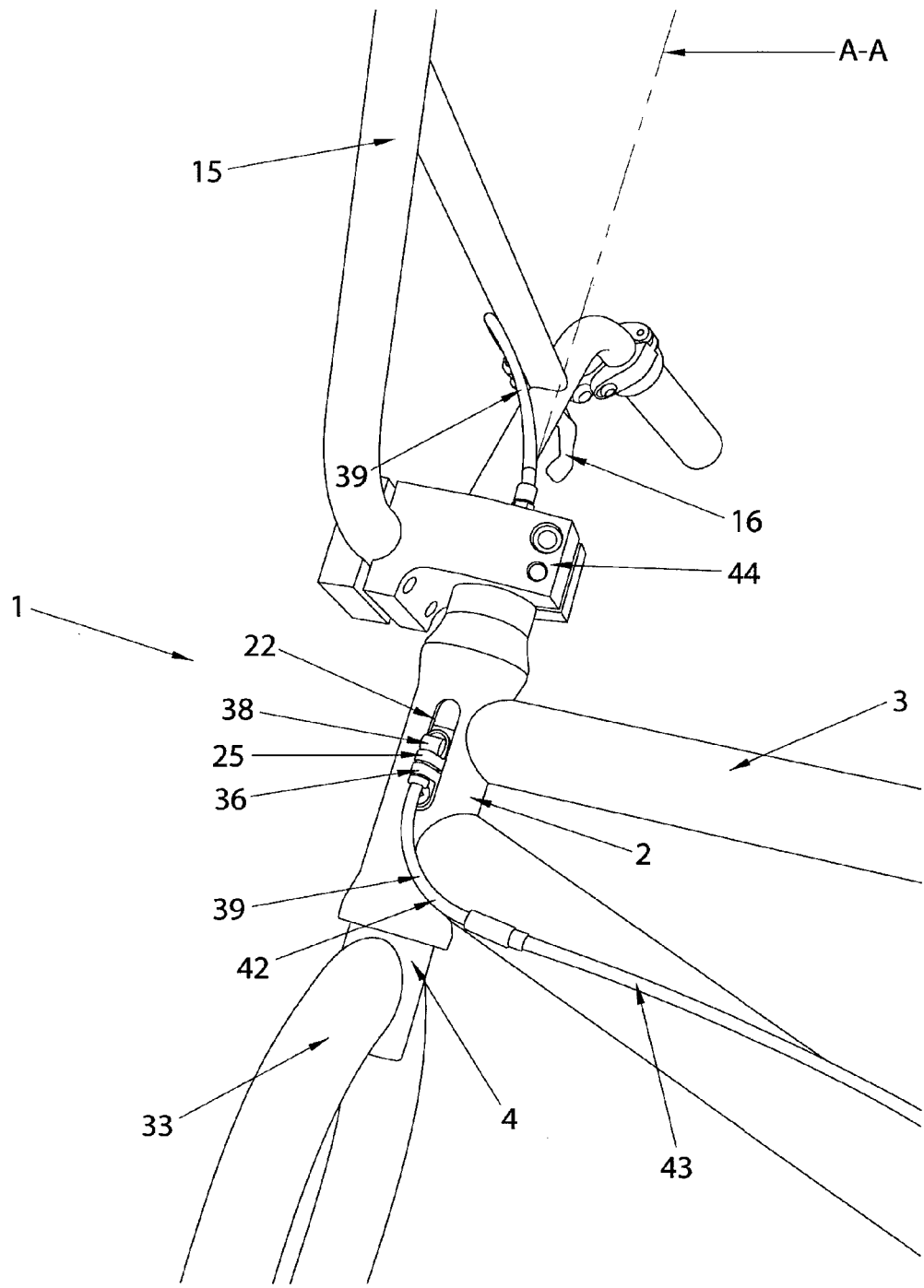
FIG. 1: is a perspective view of a front half of a cycle frame, fork and stem of a cycle showing an external view of the present invention and a handle bar mounted lever or device which is a brake.

The result externally is as shown in FIG. 1. This shows the external tab portion 25 that can translate 26 along head-tube aperture 22 under activation of the handle bar mounted lever or device 16. In this instance the handle bar mounted lever or device 16 is a brake lever to activate the rear brake 41. The tab portion 25 is driving a second flexible tensile member 14 through an external casing 39 consisting of a rigid external casing 42 or noodle and a flexible external casing 43 as shown in FIG. 1. The rigid external casing 42 is bearing on the head-tube tab 36. A similar external casing 39 containing the first flexible tensile member 12 can be seen running from the stem 44 which is attached to the upper part of the steerer tube 4. The stem 44 in turn retains the handle bars 15. The external casing 39 runs from the stem 44, up to the handle bar mounted lever or device 16, for example, as shown, a brake in FIG. 1. The first flexible tensile member 12 runs within the external casing 39 from the handle bar mounted lever or device 16 (for example a brake) to the connecting member 20.

Figure 6:
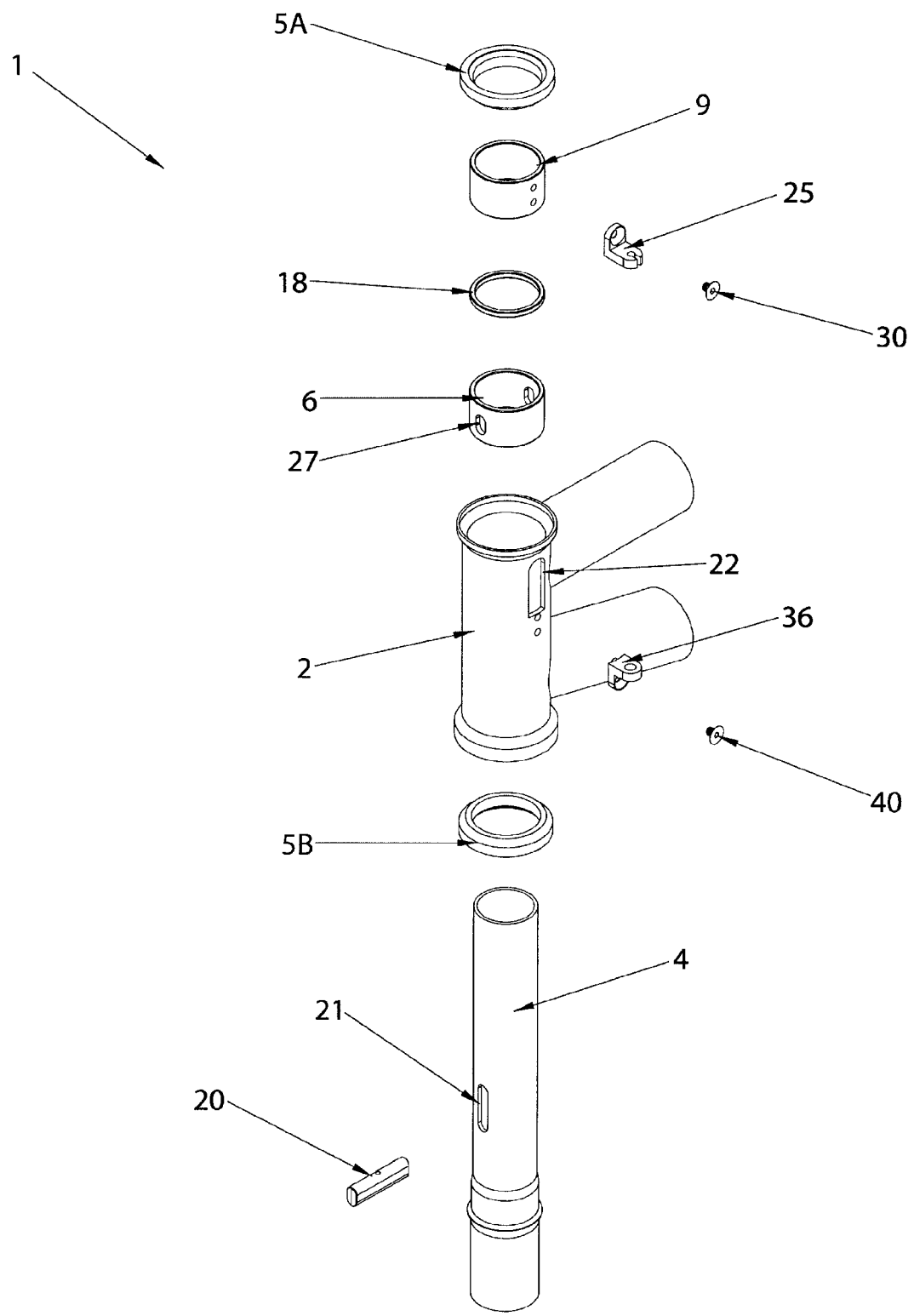
FIG. 6: is an exploded isometric front view of the embodiment of FIG. 4(B)

Further variation of the embodiments shown in FIGS. 3, 4 and 6 is shown in FIG. 5 where there are two second flexible tensile members 14. The assembly is similar to that shown in FIG. 4 with the exception that there are now two external tab portions 25 either side of the second transmission member 9 and that run in two head-tube apertures 22. Such an assembly is desirable when balanced loading of the second transmission member 9 is required. One advantage of such balanced loading is reduced friction between the interior surface of the second transmission member 9 and the exterior surface of the steerer tube 4.

Figure 7:
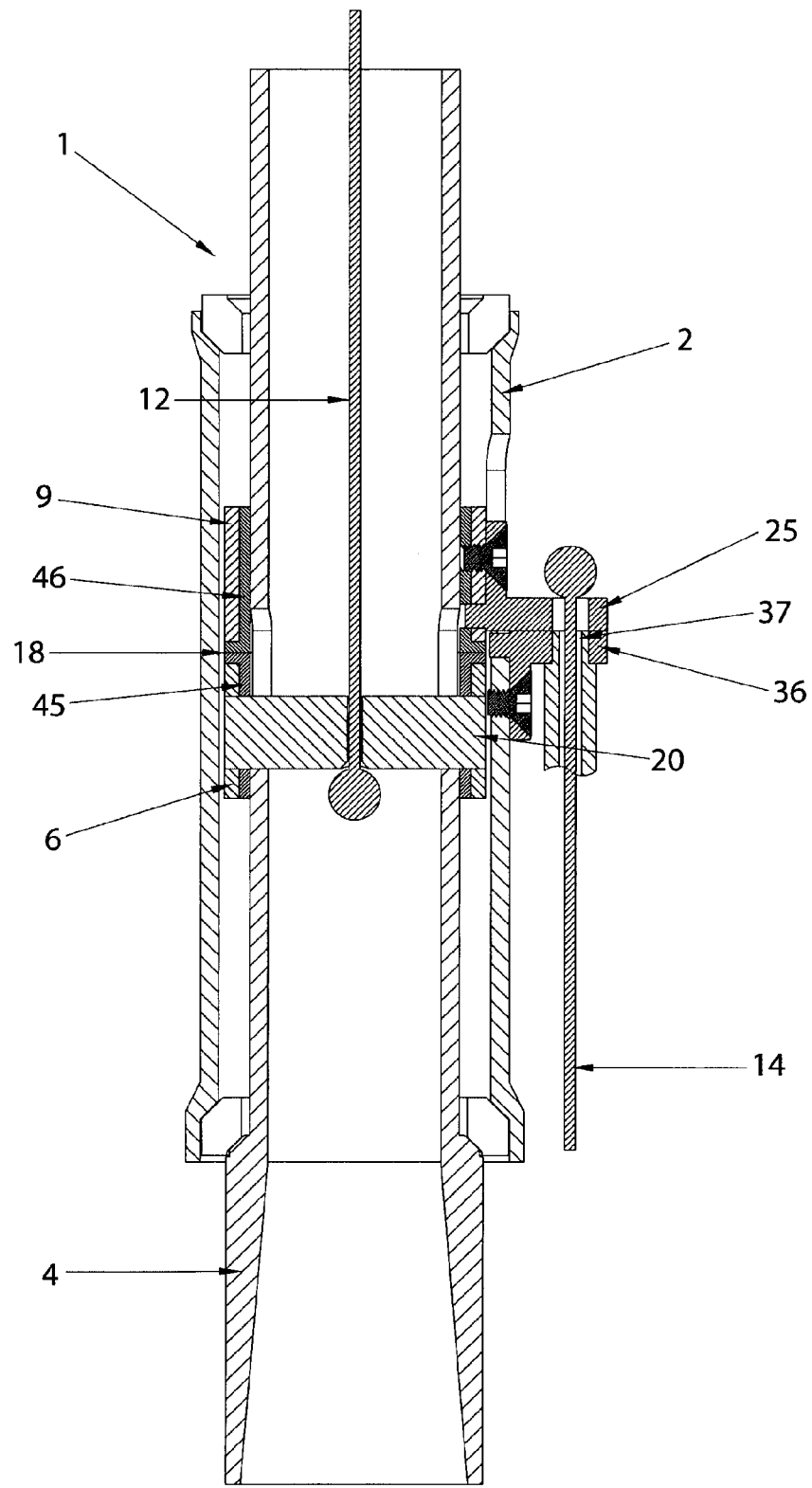
FIG. 7: is a second embodiment of the present invention showing a similar view to that of FIG. 4.
Figure 8:
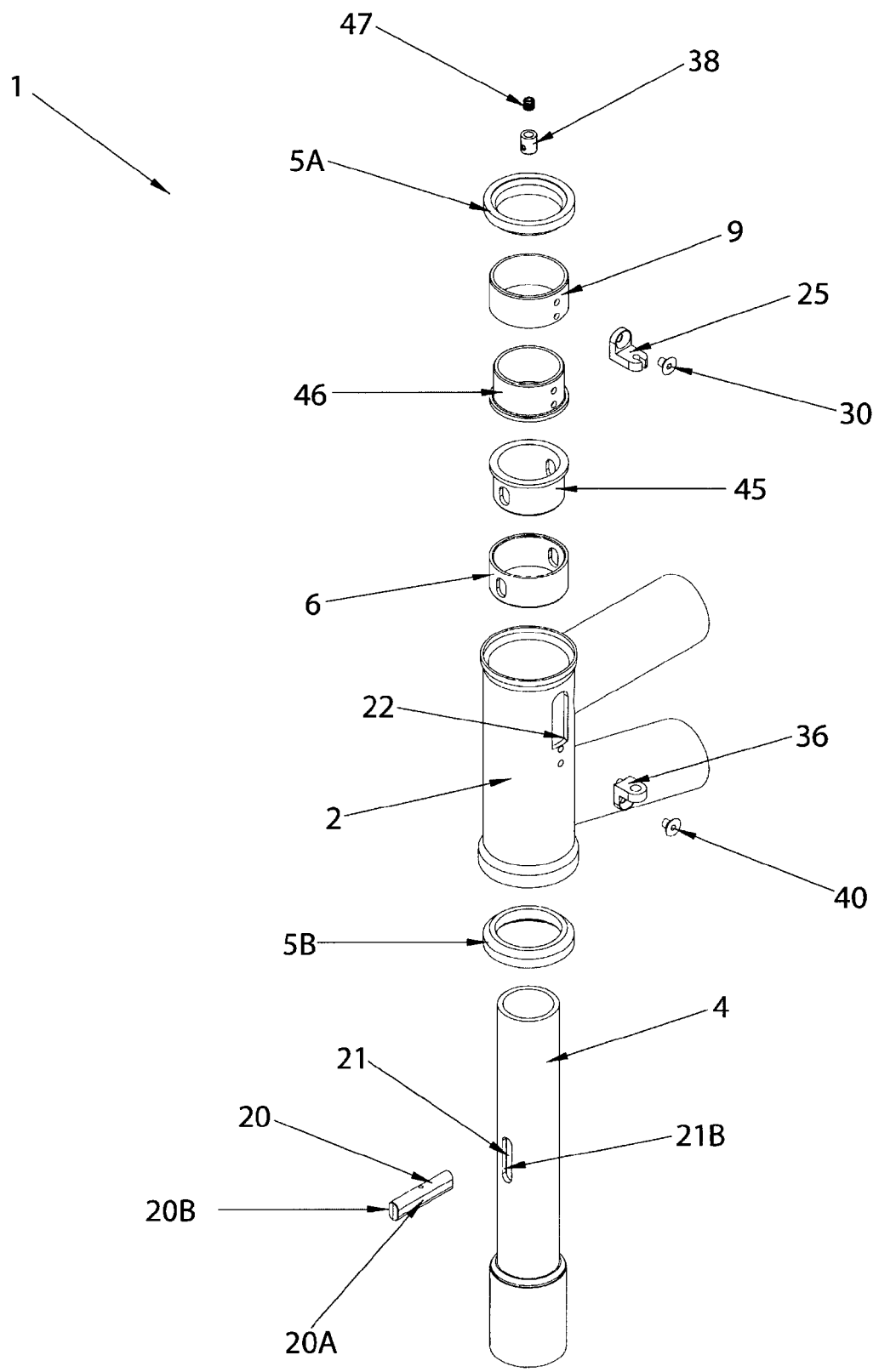
FIG. 8: is an exploded isometric front view of the second embodiment of FIG. 7.

FIGS. 7 and 8 show a second embodiment of the headset transmission 1 where the first transmission member 6 and second transmission member 9 are each of a composite construction where there is a separate replaceable first transmission member bush bearing 45 and a second transmission member bush bearing 46. The two bush bearings respectively also at the interface thereof provide a low friction interface in addition to, or instead of, the friction reducing rotational interface 18.

The connecting member 20 in the preferred embodiment shown has two parallel side surfaces 20A and 20B on either side, which is shown in FIG. 8. These two parallel side surfaces 20A, 20B distribute the load more evenly along the mating inside guide surface 21B (and its parallel opposite (not shown) on the other side of the steerer tube aperture 21) of the steerer tube aperture 21. This is a larger surface area compared to the rounded surface of the less preferable round connecting member 20, shown for example in FIG. 2. The benefit is the two parallel side surfaces 20A, 20B, and the corresponding mating inside guide surface(s) 21B of the steerer tube aperture 21 will not wear as fast compared to the rounded surface. The round connecting member 20 may eventually create uneven pits along the surfaces of both the connecting member 20 and steerer tube aperture 21.

Similarly, this embodiment may have the variation of twin second flexible tensile members 14 as, for example, shown in FIG. 5.

Variations of the invention will now be described. The first transmission member 6 and/or second transmission members 9 respectively may be less than fully enclosing of the steerer tube 4, if required. The first transmission members 6 and 9 respectively may also be two-part constructions that clamp about the steerer tube 4. The first transmission member 6 may be formed of two halves to form, for example, the first transmission member 6 or similar as shown in FIG. 2 and be formed integrally with one half or more of the connecting member 20. Therefore one half of the first transmission member 6 may be placed about the steerer tube 4 when assembling and then the second half or part of the first transmission member 6 may be engaged therewith.

In other alternative embodiments the first transmission member 6 may lie substantially within the steerer tube interior 8 and only have that part which is necessary extending external to the steerer tube 4 to activate the second transmission member 9. In other embodiments the connecting member 20 may not be present and the first flexible tensile member 12 may engage directly with the first transmission member 6. This may occur when the first transmission member 6 lies substantially within the steerer tube interior 8, or where a part of the first flexible tensile member 12 extends to engage the first transmission member 6, or vice versa, for example a portion of the first transmission member 6 may extend into the steerer tube interior 8 to engage the first flexible tensile member 12. In another embodiment the first transmission member 6 may be formed by one or more circular bearing elements (not shown) mounted on either or both sides of a connecting member 20 or equivalent. Such bearings would then engage on the lower surface of the second transmission member 9 forming a friction reducing rotational interface 18.

It is to be understood that whilst the first flexible tensile member 12 can, through the headset transmission 1, drive the second flexible tensile member 14, equally the second flexible tensile member 14 can drive the first flexible tensile member 12. For example, on a frame mounted brake 41 (see FIG. 10) the handle bar mounted lever or device 16 on the handle bar 15 may drive the compression of the rear brake 41, but the return spring (not shown) of the rear brake 41 may drive the handle bar mounted lever or device 16 when it is released.

Figure 11A:
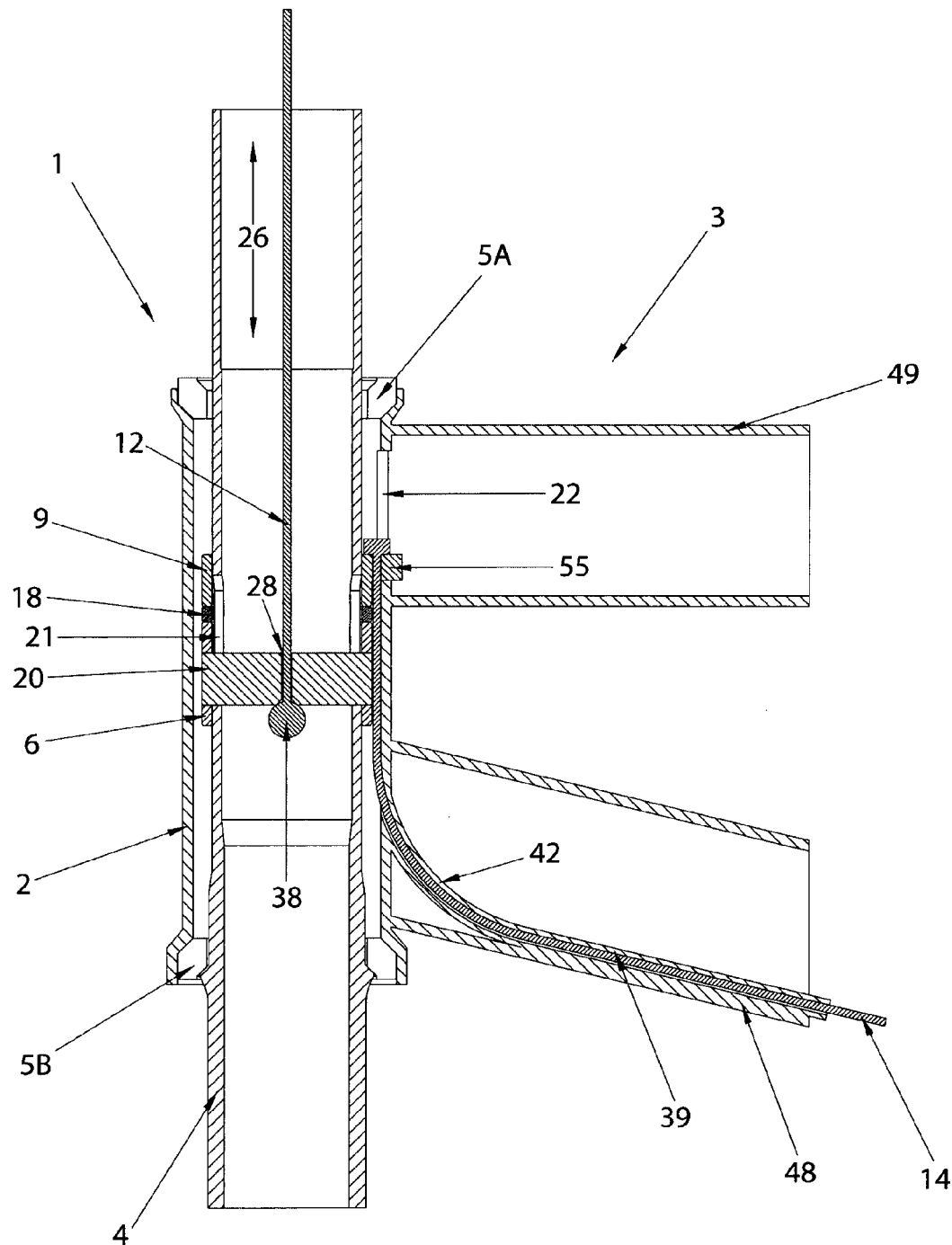
FIG. 11: (A) is a vertical cross-sectional view on a plane through the rotational axis and running from front to back of the head-tube area of a cycle frame containing a further embodiment of the present invention where the second flexible tensile member runs internally and the head-tube having an internal head-tube aperture to allow sliding and prevent rotation of the second transmission member by an internal tab portion and the second flexible tensile member runs freely until it passes into a rigid external casing within the down tube, shown also is a one piece second transmission member and internal tab portion with separate second flexible tensile member; and (B) is an isometric view of FIG. 11A showing only the cycle frame components and no fork.
Figure 11B:
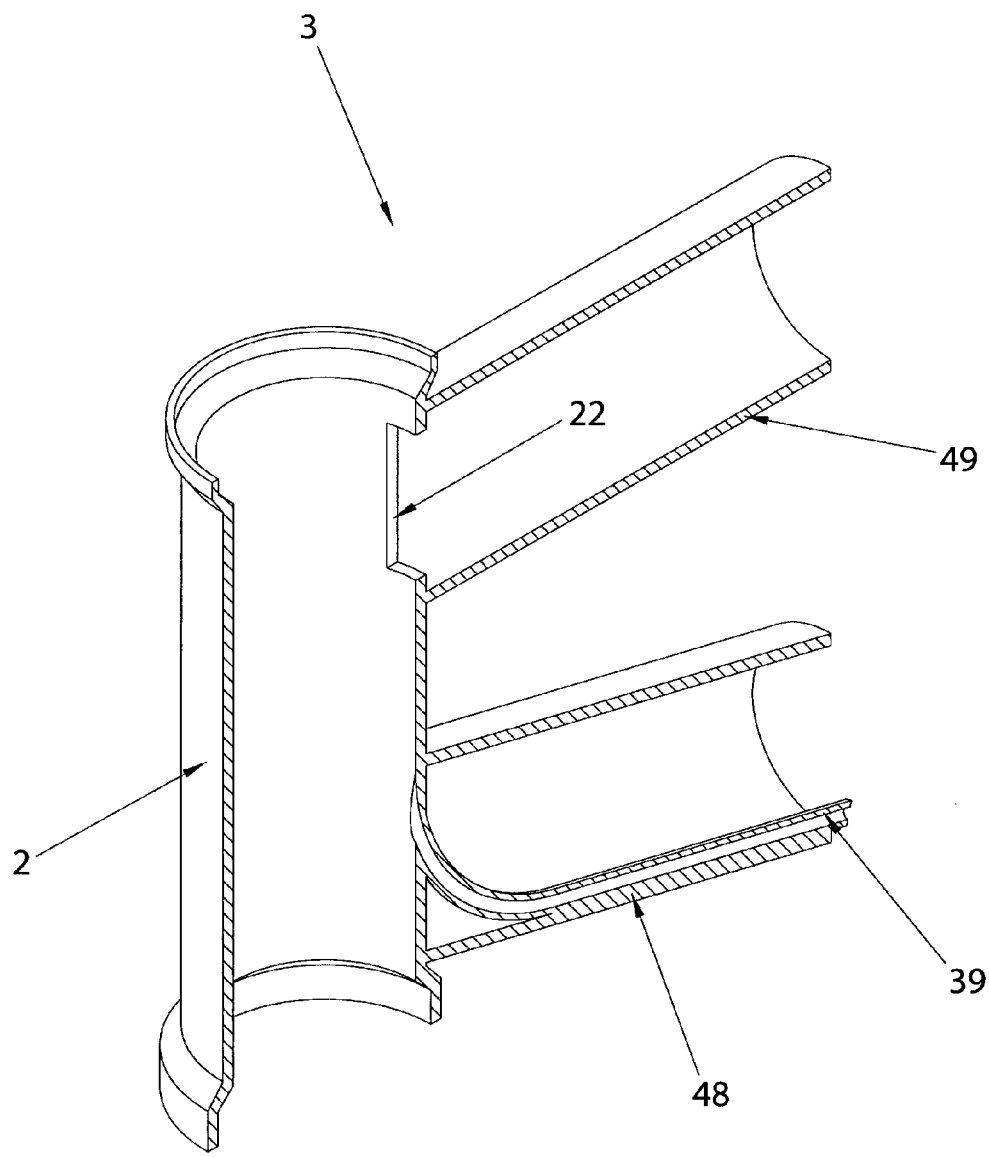
Figure 12A:
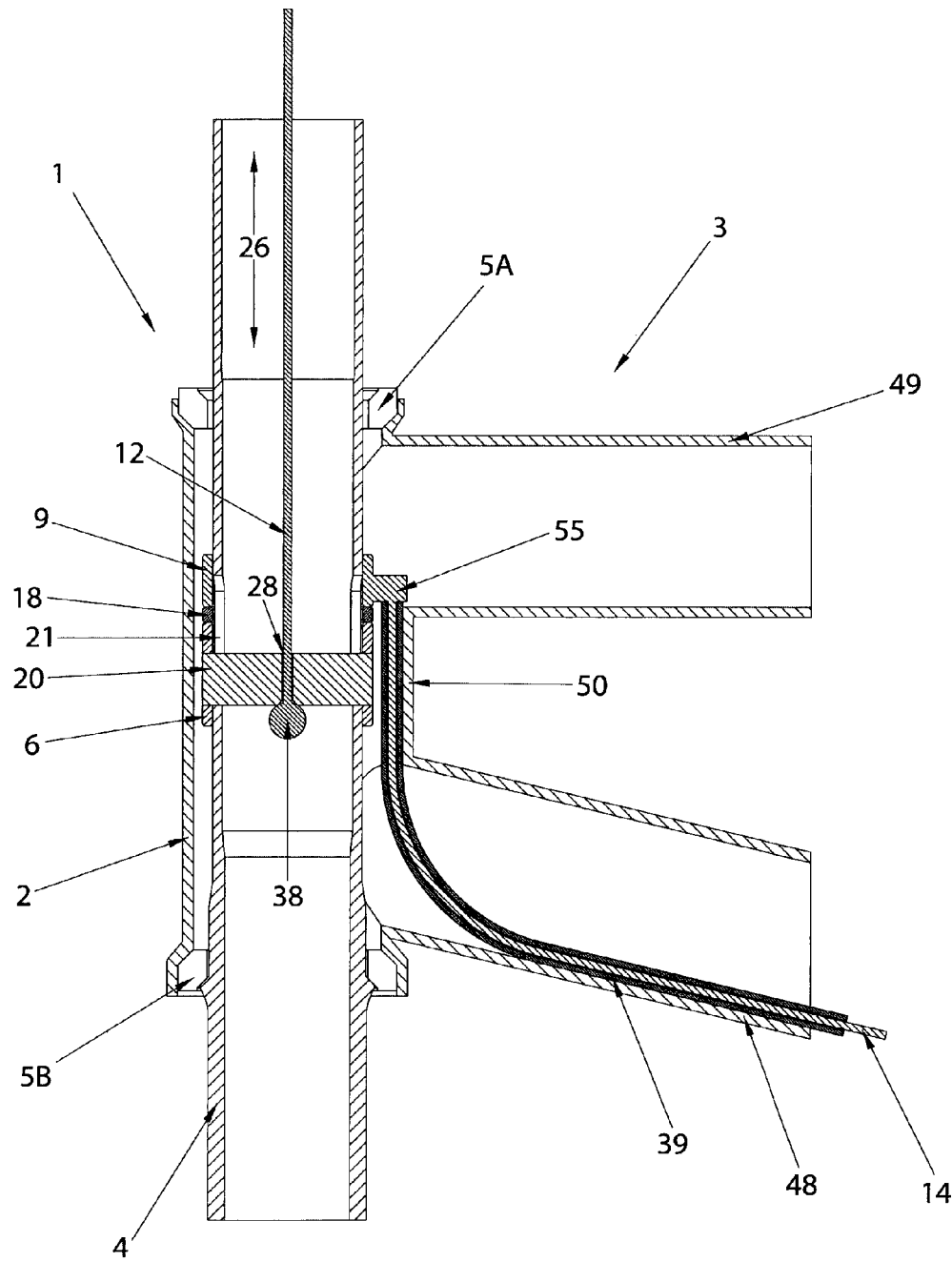
FIG. 12: (A) is a similar view to that of FIG. 11A showing a similar internal routing of the second flexible tensile member, similar but where the internal tab portion does not run in an internal head-tube aperture but rather the rigid external casing runs up from the, in this case, down tube and rotation of the second transmission member is prevented by the resident tension of the second flexible tensile member, shown also is a one piece second transmission member, internal tab portion and second flexible tensile member, a gusset for clearance is also present; and (B) is an isometric view of FIG. 12A showing only the cycle frame components and no fork.
Figure 12B:
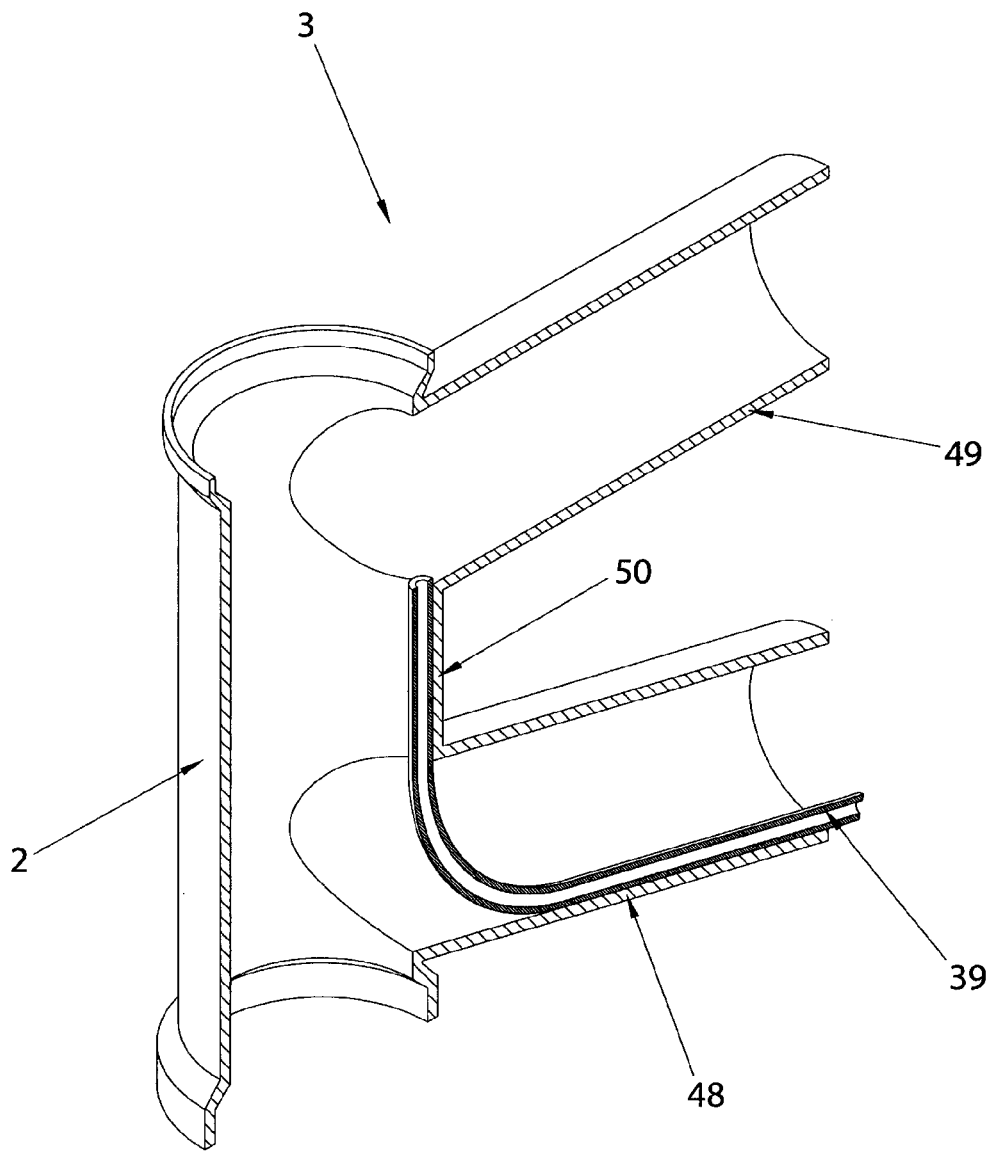
Figure 13A:
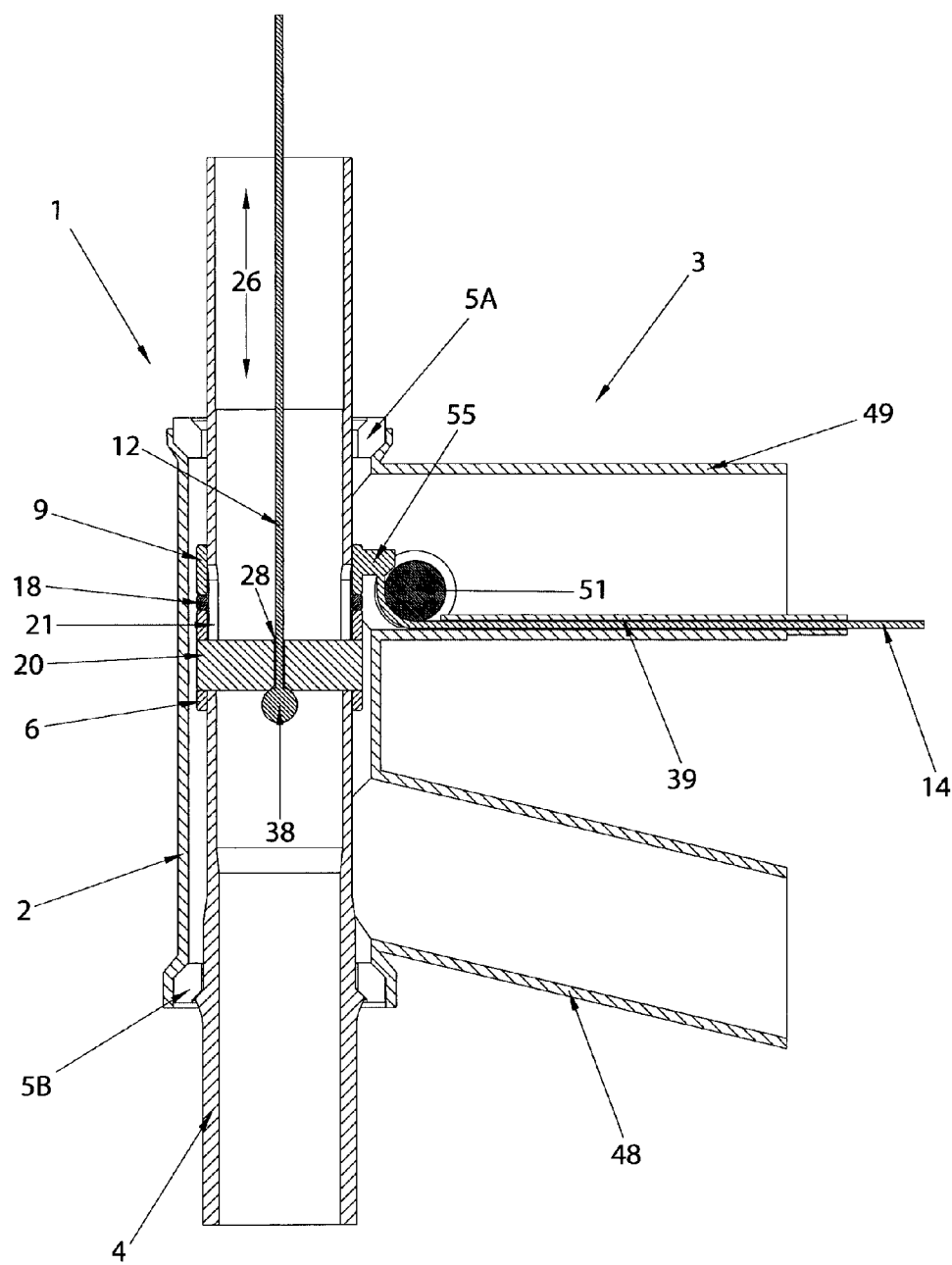
FIG. 13: (A) is a similar view to that of FIG. 11A showing a similar internal routing of the second flexible tensile member, similar but where the second flexible tensile member is routed via a pulley, in this case in the top tube, again the rotation of the second transmission member is prevented by the resident tension of the second flexible tensile member, shown also is a one piece second transmission member, internal tab portion and second flexible tensile member; and (B) is an isometric view of FIG. 13A showing only the cycle frame components and no fork.
Figure 13B:
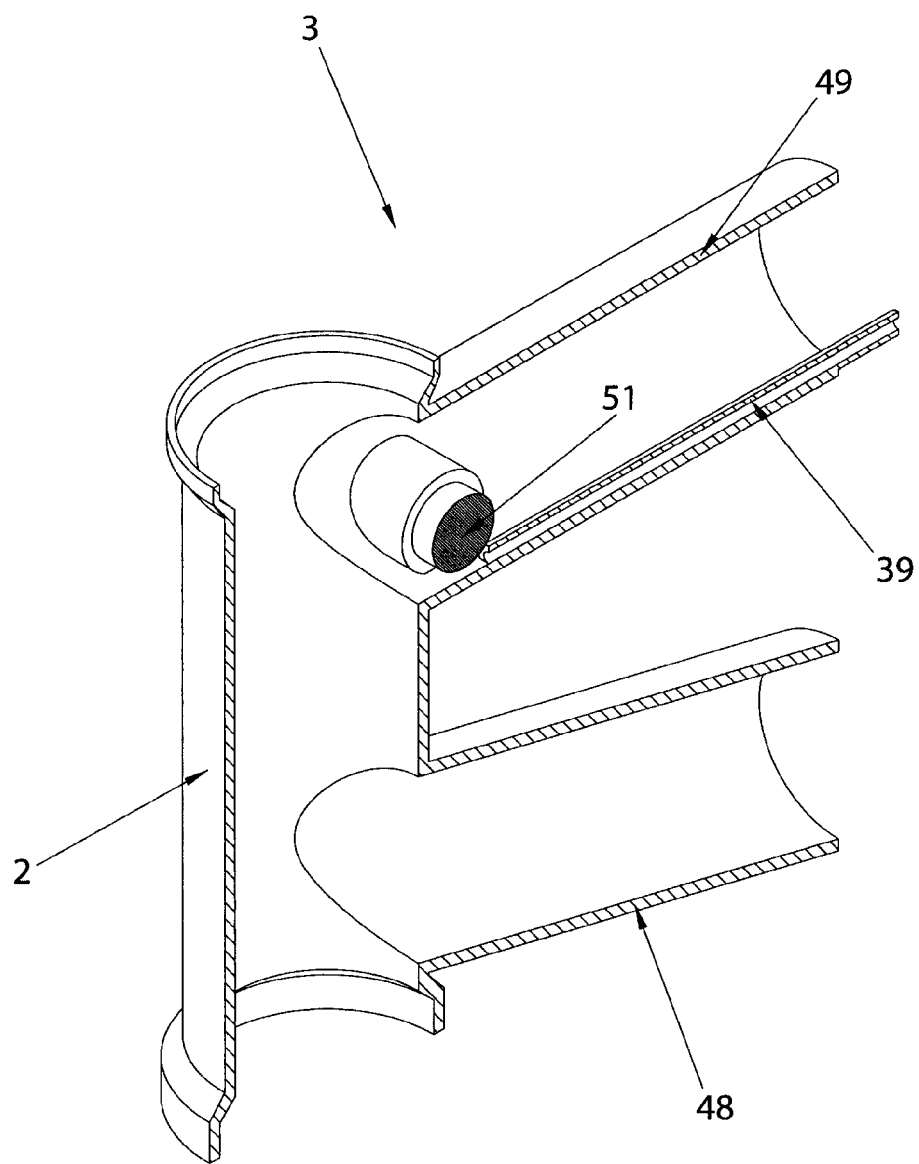

Further embodiments of the present invention are shown in FIGS. 11 through 13. In the following figures like numbers refer to like integers of previous figures. These show an internally routed second flexible tensile member 14.

In the first variation of this embodiment shown in FIGS. 11A and B the second flexible tensile member 14 runs from the second transmission member 9 into an external casing 39 (external to the second flexible tensile member 14, yet internal to the cycle frame 3). In the preferred embodiment of this variation the external casing 39 is a rigid external casing 42. However, this needs not entirely encase the second flexible tensile member 14, it may only need to be present on the inner radius of its curvature for example. In the variation shown the second flexible tensile member 14 runs free from the internal tab portion 55 (internal routing equivalent to the tab portion 25) down toward the down tube 48 wherein it enters the rigid external casing 42. In other variations the second flexible tensile member 14 and its external casing may run through the top tube 49 or may even run externally. The external casing 39 or rigid external casing 42 may continue for all or part of its internal path through the cycle frame 3 (in this case the down tube 48) and may also be interrupted.

In FIGS. 11A and B the internal tab portion 55 still retains a sliding engagement with the head-tube aperture 22. The reason for this is to engage the second flexible tensile member 14 in position as the distance between the rigid external casing 42 and the internal tab portion 55 is relatively lengthy and if not restrained properly will result in excessive cable flex when rotating the steerer tube 4. The second transmission member 9 shown in this variation is one that is unitary with the internal tab portion 55.

On other variations the rigid external casing 42 may terminate and the second flexible tensile member 14 may run unsheathed, if there are no corners or rub points, or may have rub guides to guide it. Alternatively when it terminates a flexible external casing 43 may guide the second flexible tensile member 14. Alternatively there may just be a rigid mount (not shown, but is the internal equivalent to that shown as 36 in FIG. 3 for example) from which a flexible external casing 43 then mounts to guide the second flexible tensile member 14.

A further variation is shown in FIGS. 12A and B wherein the external casing 39 (which may be a rigid external casing 42, or if a rigid mount is present may be a flexible external casing 43) runs up to just under where the second flexible tensile member 14 leaves the internal tab portion 55. In this variation a gusset 50 may be present between for example the top tube 49 and down tube 48 to provide any further clearance necessary. In other variations this may not be present or may be present as a unitary part of the head-tube 2 or similar. In this variation also the second transmission member 9, internal tab portion 55 and second flexible tensile member 14 are unitary.

In this variation there is no non-rotation guide for the internal tab portion 55 (or equivalent) as the tension of the second flexible tensile member 14 and its short exposed length prevents substantive rotation of the second transmission member 9. In other variations (not shown) it is envisaged the second flexible tensile member 14 may initially run through a rigid mount affixed to an internal surface of the cycle frame 3 and then into a flexible external casing 43 within the cycle frame 3 at least for part of it's run.

Other variations of this embodiment are a pulley 51 or sliding surface or similar as shown in FIGS. 13A and B to curve the second flexible tensile member 14 from the internal tab portion 55 (or equivalent) into the desired direction or directions. Here it is shown continuing on the inside of the top tube 49, by an external casing 39 (which also could be a rigid casing), but could equally extend down into the down tube 48 or similar. In this variation there is no non-rotation guide for the internal tab portion 55 (or equivalent) as the tension of the second flexible tensile member 14 prevents substantive rotation of the second transmission member 9.

Figure 14:
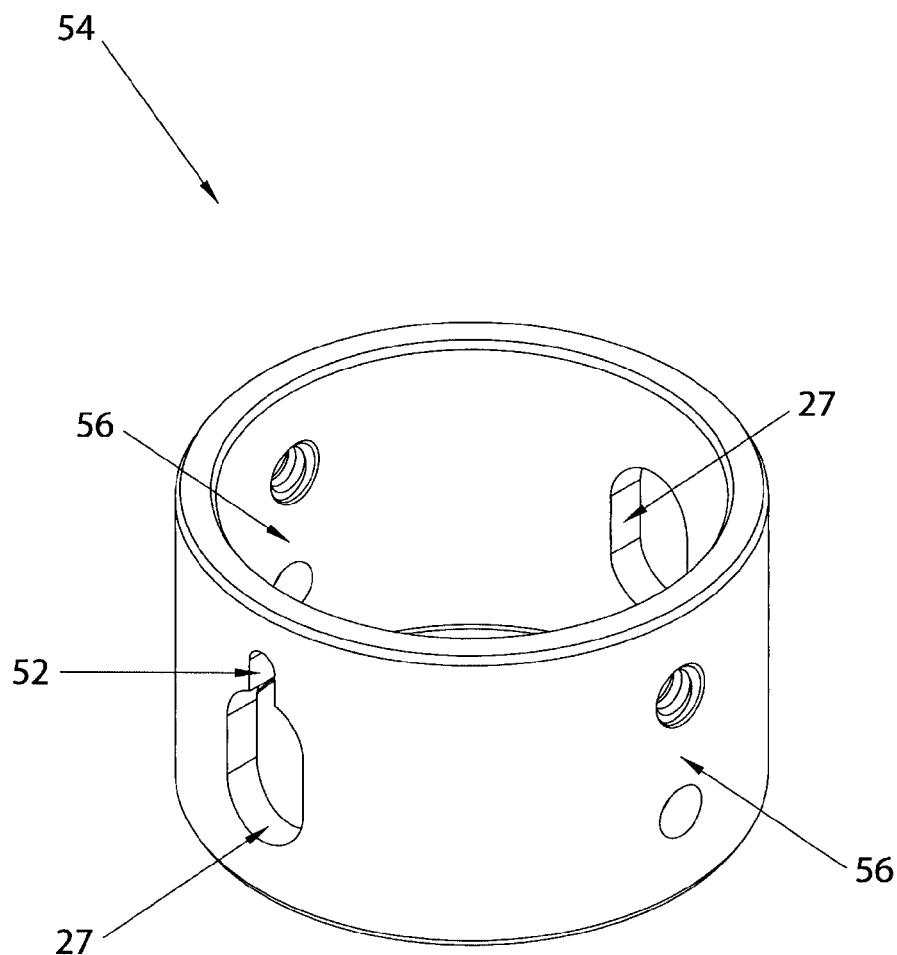
FIG. 14: is an isometric view of a common transmission member that can be used as both a first transmission member and also a second transmission member.

A further variation of the first transmission member 6 and second transmission member 9 is where both are identical to each other, such as shown in FIG. 14. The common transmission member 54 has receiving apertures 27 for a connecting member 20 as well as locations 56 to affix a tab portion 25 or internal tab portion 55. Alternatives may have locations to directly attach the first flexible tensile member 12, or second flexible tensile member 14. Alternatives again, and in general for the first transmission member 6 and second transmission member 9 (even if differently shaped) are that tab portions 25 or equivalent are unitary with the transmission member, such as shown in FIG. 11A.

In the embodiment where the first flexible tensile member 12 is unitary with, at least on assembly, the connecting member 20 then there may be a cable clearance rebate 52, as shown for example in FIG. 14 to allow sliding of the connecting member 20 and first flexible tensile member 12 into receiving aperture 27 of the first transmission member 9 from one side.

Exemplarily devices that can be attached to the handle bar 15 as handle bar mounted levers or devices 16 may be, but are not limited to, brake levers as illustrated, gear changes (whether for derailleurs, internal hub systems, continuously variable transmissions, sun gear and planet gear transmissions, or similar), levers to activate clutches, throttles, suspensions lock-outs or adjustments, or seat post actuations (for example, for adjustable or telescoping height seat posts). Similarly, the frame mounted lever or device 17 (not shown) could be, but not limited to, brakes (where the disc or rim activating or otherwise), derailleurs or internal transmissions, continuously variable transmissions, a suspension component that can be adjusted or an adjustable height seat post, carburettor or equivalent throttle device, or clutch or gear box.

Figure 9A:
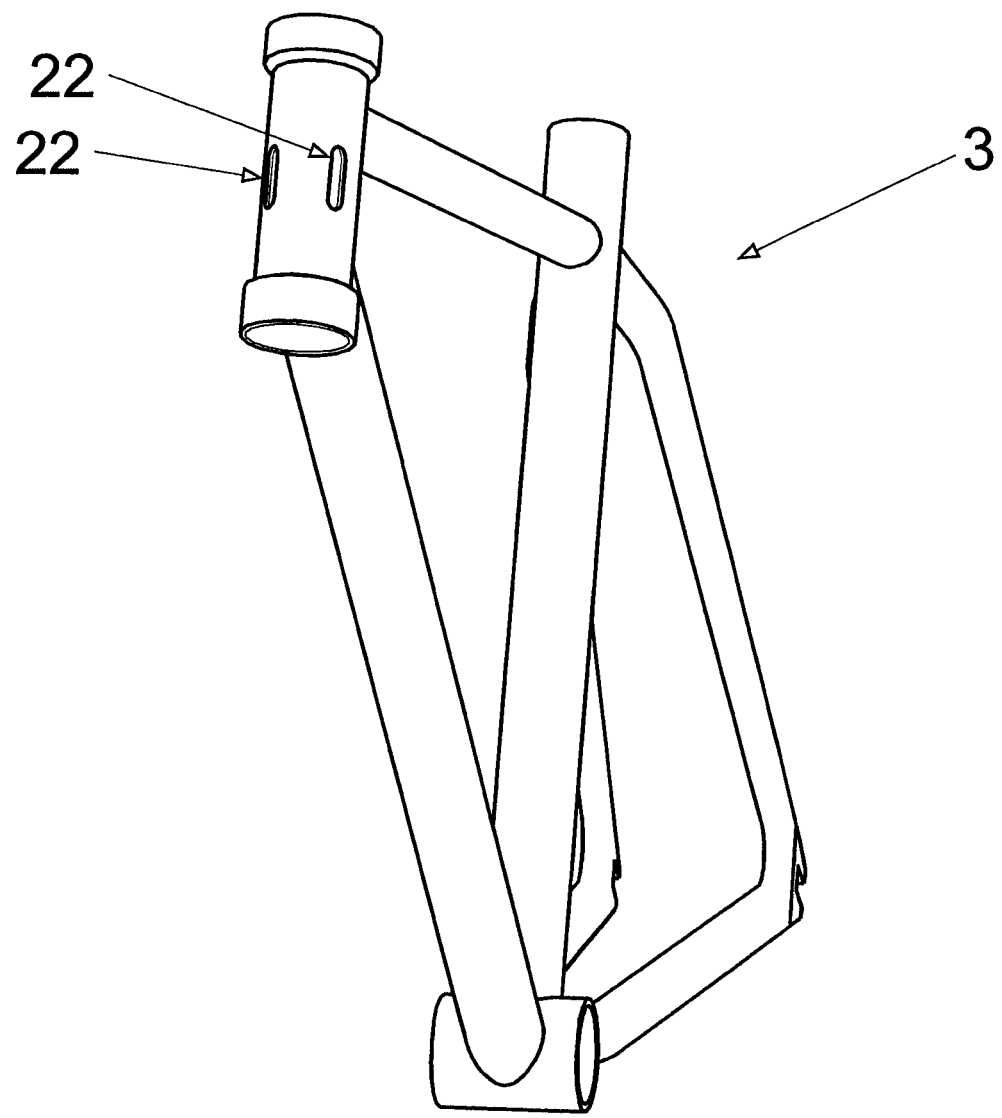
FIG. 9: (A) is a front perspective view of a cycle frame compatible with the present invention; and (B) is a front isometric view of a fork compatible with the present invention.
Figure 9B:
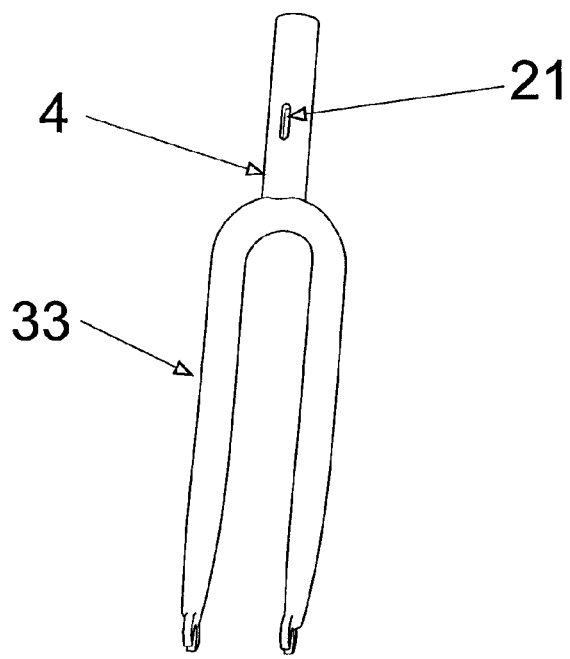
Figure 10:
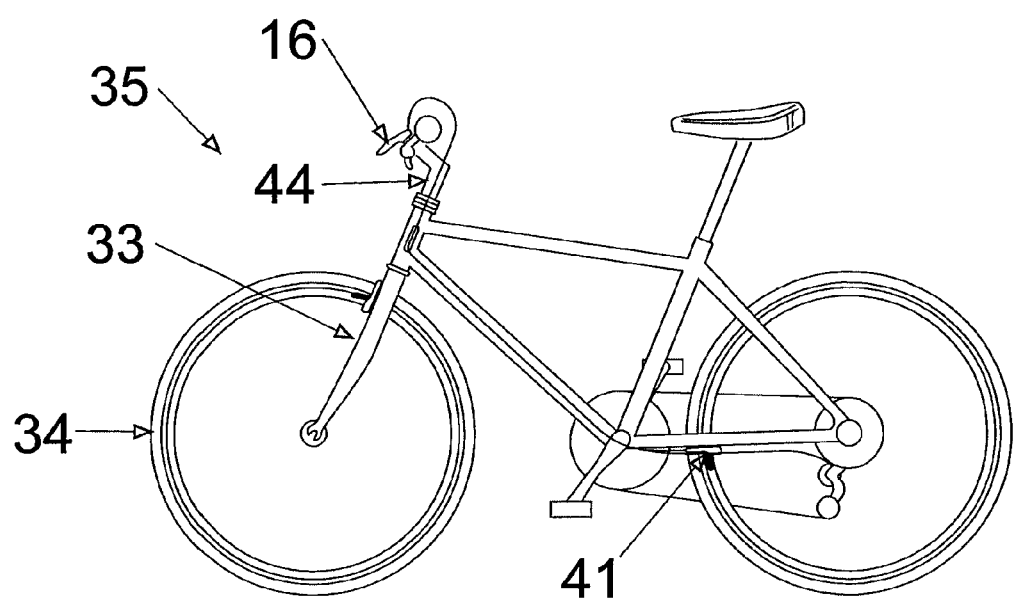
FIG. 10: is a side view of the cycle including the present invention showing the layout of various components.

The present invention also consists in a kit of parts for providing a headset transmission 1 so that a prepared cycle frame 3 and steerer tube 4 can have the headset transmission 1 of the present invention installed. Similarly, the steerer tube 4 on a fork 33 may be provided that includes a steerer tube aperture 21, as shown in FIG. 9B. Similarly, a cycle frame 3 for a cycle 35 may be provided that includes at least one head-tube aperture 22, as shown in FIG. 9A.

The advantages of the present invention are a low friction pull cable transmission for a headset 5 of a cycle 35 that has balanced loading at least from the handle bar mounted lever or device 16 to one part of the transmission (the first transmission member 6). The headset transmission 1 has solid rotational isolation of the components from each other. The advantage of such rigid solid isolation such as via the external tab portion 25 against the head-tube aperture 22 and, similarly, the first transmission member 6 against the steerer tube aperture 21 is that cables and similar flexible tensile members are left to purely transmit tensile forces derived from actuation of the lever devices on the cycle frame 3 and/or the handle bar 15. They are not therefore required to also restrain the rotation of the various components of the headset transmission 1. This reduces friction, tangling of cables and potential false activation of components. For example, if for any reason there was to be a rotational binding of the first transmission member 6 equivalent to the second transmission member 9 equivalent in some of the prior art products, this could potentially activate, for example, a brake or gear change at the worst possible moment. In comparison, having separate and rigid rotational isolation of the two rotating components (the first transmission member 6 and the second transmission member 9) assures that, even in an event of increased friction between the two, there will not be false activation of components.

The headset transmission 1 of the present invention is also very compact and has a low profile when compared to those of the prior art. This allows the invention to fit into standard cycle head-tube 2 and standard cycle steerer tube 4 and thus give the user an option to use standardised cycle headsets 5. Such use of the standard sizes has benefits in cost both to the manufacturer and end purchaser and user. It does not require the manufacturer to retool for different head-tube 2 sizes. This can be a major expense as it is often simply not a matter of sizing the head-tube 2 up, because all the tubes are designed in concert with each other. Simple sizing up one tube (such as the head-tube 2) can weaken its connection to other tubes, or load them differently and undesirably. Therefore allowing the headset transmission 1 of the present invention to reside within standard head-tubes 2, steerer tubes 4 and headsets 5 is a significant advantage. It also provides a more aesthetically pleasing line to the cycle 35.

The foregoing description of the invention includes preferred forms thereof. Modifications may be made thereto without departing from the scope of the invention.

The invention claimed is:

1. A headset transmission adapted to mount to or about a steerer tube rotationally mounted relative to a head-tube of a cycle frame via a headset, comprising or including:
   a first transmission member mountable at least in part about a rotational axis of said steerer tube, which first transmission member:
      can rotate with said steerer tube about said rotational axis;
      can translate relative to said steerer tube to transmit a first displacement force to or from a handle bar mounted lever or device; and
      wherein said first displacement force is transmitted to or from said first transmission member to said handle bar mounted lever or device from an interior of said steerer tube;
   a second transmission member mountable at least in part about said rotational axis of said steerer tube, which second transmission member:
      is mounted substantially only on, or from, said steerer tube;
      is rotationally isolated, so as to rotate relative to said first transmission member;
      can directly or indirectly translate with said first transmission member; and
      wherein said second transmission member allows transmission of a second displacement force, at least proportional to said first displacement force, to or from a cycle frame mounted lever or device.

2. A headset transmission as claimed in claim 1 wherein said rotational isolation is via a sliding engagement of said second transmission member with an interior, exterior or part thereof of said head-tube.

3. A headset transmission as claimed in claim 2 wherein said first displacement force is transmitted to or from said first transmission member by a first flexible tensile member engaged or engageable between said first transmission member and said handle bar mounted lever or device.

4. A headset transmission as claimed in claim 3 wherein said first flexible tensile member is directly engaged or engageable to said first transmission member via a connecting member that runs at least in part in said interior of said steerer tube.

5. A headset transmission as claimed in claim 4 wherein said connecting member extends laterally to said rotational axis to load said first transmission member substantially equally either side of said rotational axis.

6. A headset transmission as claimed in claim 4 wherein said steerer tube has at least one steerer tube aperture to rotationally engage with said first transmission member and cause said first transmission member to rotate with said steerer tube.

7. A headset transmission as claimed in claim 6 wherein said at least one steerer tube aperture allows translation via said sliding engagement with said connecting member.

8. A headset transmission as claimed in claim 7 wherein said connecting member has at least one flat side surface to run against a mating inside guide surface of said steerer tube aperture.

9. A headset transmission as claimed in claim 4 wherein said connecting member as a pin lies on any one or more of:
   a. a plane that lies substantially orthogonal to said rotational axis, at any angle on said plane; or
   b. a vertical plane that passes through said rotational axis and said vertical plane is substantially parallel to a straight-ahead steering position of a fork attached to said steerer tube.

10. A headset transmission as claimed in claim 2 wherein a portion of said second transmission member extends externally from said head-tube via at least one head-tube aperture to provide said rotational isolation via said sliding engagement with said portion.

11. A headset transmission as claimed in claim 10 wherein said at least one head-tube aperture is internal or external to said cycle frame.

12. A headset transmission as claimed in claim 10 wherein a second flexible tensile member lies internally or externally of said cycle frame, at least initially where it is engaged to and departs from said second transmission member.

13. A headset transmission as claimed in claim 12 wherein said second flexible tensile member is guided internally at least in part by a rigid mount.

14. A headset transmission as claimed in claim 12 wherein said portion engages said second flexible tensile member to drive or be driven by, said frame mounted lever or device.

15. A headset transmission as claimed in claim 12 wherein there is a biasing means to aid movement of said first or second flexible tensile member wherein said biasing means is in compression between an end of an external casing for said first or second flexible tensile member and an end of said first or second flexible tensile member.

16. A headset transmission as claimed in claim 12 wherein said second flexible tensile member is directly engaged to said second transmission member, or part thereof.

17. A headset transmission as claimed in claim 12 wherein said second flexible tensile member is unitary with said second transmission member.

18. A headset transmission as claimed in claim 1 wherein said first transmission member sits substantially internally or externally of said steerer tube.

19. A headset transmission as claimed in claim 1 wherein said handle bar mounted lever or device is selected from any one or more of the following, but not limited to:
   a brake lever;
   a gear lever or equivalent;
   a suspension adjustment lever; and
   a seat post adjustment lever.

20. A headset transmission as claimed in claim 1 wherein between said first transmission member, said second transmission member and said steerer tube there are friction reducing interfaces.

21. A headset transmission as claimed in claim 1 wherein said first and second transmission members are substantially identical to each other.

22. A method of providing a headset transmission for a cycle, said cycle having a steerer tube mounted in a head-tube of a frame of said cycle via a headset, comprising or including the steps of:
   providing a first transmission member and a second transmission member mounted at least in part about a rotational axis of a steerer tube, at least said second transmission member is mounted substantially only on, or from, said steerer tube, such that said first transmission member can rotate about said rotational axis and translate along said steerer tube, and said second transmission member can translate with or is driven by said first transmission member but is isolated so as to not rotate with said first transmission member;
   providing a first driving or displacement force to or from said first transmission member via an internal region of said steerer tube;
   providing a portion of said second transmission member to receive or transmit a second driving or displacement force; and
   wherein said headset transmission can transmit a force to or from a handle bar device mounted on a handle bar of said steerer tube or part thereof, from or to a frame mounted device or vice versa, whilst allowing rotation of said steerer tube to more than 180 degrees.

23. A kit of parts adapted to provide at least one headset transmission for a frame of a cycle, said frame having a head-tube to receive a steerer tube to rotate thereon via a headset, comprising or including:
   a first transmission member mountable at least in part about a rotational axis of said steerer tube, which first transmission member:
   can rotate with said steerer tube about said rotational axis;
   can translate relative to said steerer tube to transmit a first displacement force to or from a handle bar mounted lever or device; and
   wherein said first displacement force is transmitted to said first transmission member from an interior of said steerer tube;
   a second transmission member mountable at least in part about said rotational axis of said steerer tube, which second transmission member:
   is mounted substantially only on, or from, said steerer tube;
   is rotationally isolated, so as to rotate relative to said first transmission member;
   can directly or indirectly translate with said first transmission member; and
   wherein said second transmission member allows transmission of a second displacement force, at least proportional to said first displacement force, to or from a cycle frame mounted lever or device.

* * * * *

UNITED STATES PATENT AND TRADEMARK OFFICE
CERTIFICATE OF CORRECTION

| | | |
|---|---|---|
| PATENT NO. | : 9,187,146 B2 | |
| APPLICATION NO. | : 13/701214 | |
| DATED | : November 17, 2015 | |
| INVENTOR(S) | : Savy Man | |

It is certified that error appears in the above-identified patent and that said Letters Patent is hereby corrected as shown below:

In The Specification

Column 3, between lines 36 and 37 add paragraph -- Preferably said at least one steerer tube aperture allows said translation via said sliding engagement with said connecting member. --

Column 8, Lines 54-67 should read -- Various cut-outs and reliefs may be present on the first transmission member 6 and/or second transmission member 9 to reduce its weight and/or reduce contact surfaces to reduce friction, or serve other functions such as mounting points. In a preferred embodiment the headset transmission 1 may be made from a combination of materials such as lightweight alloy for the first and second transmission member 6 and 9 respectively, or a low friction material such as a nylon or glass reinforced plastic. The friction reducing rotational interface 18 and friction reducing interface 19 may be made from a friction reducing material, or coated with such a material, such as PTFE, nylon or a sintered material, such as bronze or a ceramic. In other embodiments the friction reducing rotational interface 18 may actually be a radial array of ball bearings or other such assemblies known in the art to... --

Signed and Sealed this
Twelfth Day of April, 2016

Michelle K. Lee
*Director of the United States Patent and Trademark Office*